US007643468B1

(12) United States Patent
Arregoces et al.

(10) Patent No.: US 7,643,468 B1
(45) Date of Patent: Jan. 5, 2010

(54) DATA-CENTER NETWORK ARCHITECTURE

(75) Inventors: Mauricio Arregoces, Rancho Palos Verdes, CA (US); Maurizio Portolani, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 630 days.

(21) Appl. No.: 11/227,377

(22) Filed: Sep. 14, 2005

Related U.S. Application Data

(60) Provisional application No. 60/623,810, filed on Oct. 28, 2004.

(51) Int. Cl.
 *H04L 12/28* (2006.01)
(52) U.S. Cl. .................. 370/351; 709/229; 709/249
(58) Field of Classification Search ................ 370/351, 370/389; 709/249, 229, 201
 See application file for complete search history.

(56) References Cited

U.S. PATENT DOCUMENTS

| 6,614,781 | B1 | 9/2003 | Elliott et al. | |
| 6,857,059 | B2 | 2/2005 | Karpoff et al. | |
| 7,096,269 | B2* | 8/2006 | Yamagami | 709/229 |
| 2003/0133450 | A1* | 7/2003 | Baum | 370/389 |
| 2005/0021869 | A1* | 1/2005 | Aultman et al. | 709/249 |
| 2005/0131990 | A1* | 6/2005 | Jewell | 709/201 |
| 2005/0281470 | A1* | 12/2005 | Adams | 382/232 |

OTHER PUBLICATIONS

Cisco Systems, Inc., "Data Center Infrastructure Architecture Overview", Copyright © Mar. 2004, 31 pages.
Cisco Systems, Inc., "Data Center Segmentation In The Business Ready Data Center Architecture", Copyright © 1992-2004, 9 pages.

\* cited by examiner

*Primary Examiner*—Albert T Chou
(74) *Attorney, Agent, or Firm*—Trellis IP Law Group, PC

(57) ABSTRACT

A data-center network architecture. The data-center network architecture incorporates a front end having an aggregation layer exhibiting integrated service-module intelligence. A server farm connects the front end with a storage network. In a specific embodiment, the aggregation layer includes plural interconnected multilayer switches incorporating service-module intelligence implemented via one or more service modules. Plural layer-2 switches communicate with the plural multilayer switches. The server farm includes one or more servers that are dual homed or multihomed with the plural layer-2 switches. The storage network includes plural interconnected multilayer directors and one or more Fibre Channel hosts using Host Bus Adapters (HBAs) that interface one or more data-storage devices to the server farm.

13 Claims, 14 Drawing Sheets

DATA-CENTER NETWORK ARCHITECTURE

CLAIM OF PRIORITY

This invention claims priority from U.S. Provisional Patent Application Ser. No. 60/623,810 filed Oct. 28, 2004, which is hereby incorporated by reference as if set forth in full in this specification.

BACKGROUND OF THE INVENTION

This invention is related in general to networking and more specifically to versatile network architectures and accompanying systems and methods for configuring associated networks.

Systems for configuring networks are employed in various demanding applications including establishing university, government, and business networks. Such networks often demand reliable network architectures that may be readily adapted to meet the needs of a given application.

Business networks, such as e-commerce and business-to-business data-center networks, are often particularly demanding. Such applications often require customized distributed-data networks that provide various intelligent, secure, and reliable core functions, such as but not limited to Ethernet switching, Fiber-channel switching, and Infiniband switching as well as application services, such as anomaly detection, intrusion detection, content switching, firewall, and so on, in a flexible and scaleable server-farm environment.

Conventionally, businesses design and build custom networks tailored to specific applications. Certain features, such as anomaly detection, call management, and so on, are required for some applications and not for others. Accordingly, any special requirements were typically met by custom designing and incorporating each desired network feature. This resulted in excessive design and development costs.

DETAILED DESCRIPTION OF EMBODIMENTS OF THE INVENTION

A preferred embodiment of the present invention provides a network architecture and accompanying method that facilitate configuring a network. In one embodiment, the method includes determining network elements, including core, aggregation, access, and edge switches, service devices, storage devices, and server farms to be incorporated in the network. Service devices are described as service modules, yet appliances may also provide similar functions. The reference to service devices is inclusive of appliances and modules. Specific service functions, collectively known as service intelligence is then deployed at the aggregation switches for Ethernet environment, and Core layer for Fibre Channel and Infiniband environments. The network elements are then interconnected according to design parameters for a given application. Examples of service-module intelligence in Ethernet environments include firewall, content-switching, anomaly-detection, and intrusion-detection services provided by modules accompanying the aggregation switches. Examples of service intelligence in Fibre Channel environments include storage virtualization, data replication and fabric gateway services. Examples of service intelligence in Infiniband environment include server virtualization, RDMA (remote direct memory access), and fabric gateway services.

For clarity, various well-known components, such as power supplies, communications ports, operating systems, and so on, have been omitted from the figures. However, those skilled in the art with access to the present teachings will know which components to implement and how to implement them to meet the needs of a given application. Additionally, network areas such as the wide area network (WAN), metropolitan area network (MAN) and branch offices are not explained in detail and only referenced in relation to the data center architecture.

Figure 1:
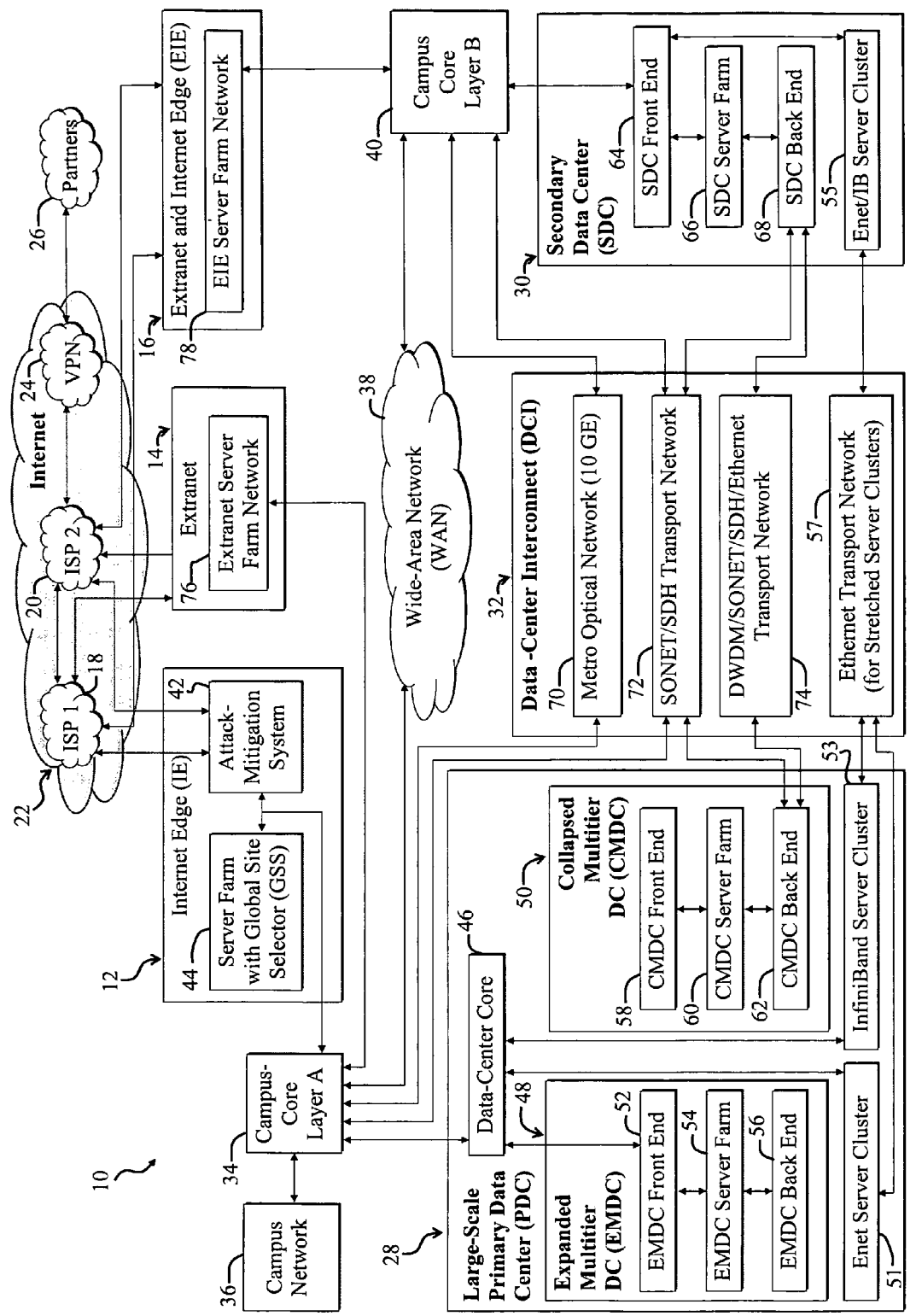
FIG. 1 is a diagram of an illustrative network architecture template adapted to facilitate selecting a network configuration according to an embodiment of the present invention.

FIG. 1 is a diagram of an illustrative network architecture template 10 adapted to facilitate selecting a network configuration according to an embodiment of the present invention. The network architecture 10 includes an Internet-Edge (IE) network 12, an extranet 14 which are part of the primary site, and a combined Extranet and Internet Edge (EIE) network 16, which are part of the secondary site, all communicate with a first Internet Service Provider (ISP1) 18 and a second Internet Service Provider (ISP2) 20 (two service providers for redundancy). The ISPs 18, 20 are incorporated within the Internet 22, which is used by client and partners 26 of the proprietor of the network 10 (such as a corporation, school, and so on) to access the proprietor's electronic resources, which are implemented via various network elements, as discussed more fully below. For illustrative purposes, an Internet-based Virtual Private Network (VPN) 24 supports secure partner connectivity through encrypted communication channels either as point-to-point (site-to-site) or client-to-server VPN using IPSec (Internet Protocol Security) and/or SSL (Secure Socket Layer). The VPN environment 24 reaches the proprietor of the network 10 through either the first ISP 18 or the second ISP 20. The IE network 12, extranet 14 (which supports a primary site, as discussed more fully below), and the EIE network 16 (which supports a distributed site, also called a secondary site, as discussed more fully below) together comprise a larger Internet-edge network as discussed more fully below.

The network architecture 10 further includes a large-scale Primary Data Center (PDC) 28 (which is part of a primary site, as discussed more fully below) and a Secondary DC (SDC) 30 (which is part of a secondary site, as discussed more fully below), which may intercommunicate via one of more options in the Data Center (DC) Interconnect (DCI) system 32. A first campus-core layer (campus-core layer A) 34 (which is part of a primary site, as discussed more fully below) interfaces the PDC 28, DCI system 32, a campus network 36, and a Wide Area Network (WAN) 38 with the IE network 12 and the extranet 14. A second campus-core layer (campus-core layer B) 40 (which is part of a secondary site, as discussed more full below) interfaces the WAN 38, the DCI system 32 and the secondary DC 30 with the EIE network 16.

The IE network 12 includes an attack-mitigation system 42 that blocks or otherwise handles attacks originating from the Internet 22, a so-called DeMilitarized Zone (DMZ) for Internet facing servers and firewalls to secure access to and from the Internet. The IE network 12 further includes a server farm and accompanying Global Site Selector (GSS) 44 that are positioned in the demilitarized zone.

The IE 12 may implement various edge services as discussed more fully below. For example, the attack-mitigation subsystem may implement anomaly detection, intrusion detection, resource monitoring, and so on. Various edge services and related functions could be available via service modules, such as appliances or software modules. For the purposes of the present discussion, service modules may be hardware or software entities, such as appliances and software modules. Appliances may be devices that are external to a central switching system, i.e., core-layer switches, as discussed more fully below. Service modules that are software modules may be integrated with the switching system. The switching system may comprise layer-3 switches, such as routers, that interface the IE 12 with the ISPs 18, 20, as discussed more fully below. The server farm 44 and certain accompanying devices providing edge services, such as site selection, are connected to the first campus-core layer 34.

The large-scale PDC 28 includes a DC core 46 that interfaces an accompanying expanded multitier DC (EMDC) 48, collapsed multitier DC (CMDC) 50, an Ethernet-(Enet) server cluster 51, an InfiniBand (IB) server cluster 53, and the primary campus-core network 34. The EMDC 48 comprises a network that includes an EMDC front end 52, behind which is connected an EMDC server farm 54, behind which is connected an EMDC back end storage network 56. Similarly, the CMDC 50 includes a CMDC front end 58, behind which is connected a CMDC server farm 60, behind which is connected a CMDC back end storage network 62. Similarly, the SDC 30 (which is part of a secondary site, as discussed more fully below) comprises a network that includes a Secondary Data Center (SDC) front end 64 as discussed more fully below), behind which is connected an SDC server farm 66, behind which is connected an SDC back end 68. A secondary server cluster 55 is connected to switches of the SDC front end 64, as discussed more fully below. The secondary server cluster 55 is implemented as an Enet server cluster, an InfiniBand server cluster, or both thereof in the present specific embodiment. Examples of suitable Enet and InfiniBand server clusters, which include a cluster core, behind which is connected an aggregation layer, behind which is connected an access layer, are discussed more fully below. The core layers of the server clusters 51, 53, 55 provide connectivity between the server clusters 51, 53, 55 and other network entities, such as the data center core 46 and the SDC front end 64.

The DCI system 32 includes the following choice for connectivity between the primary and secondary sites: a metro optical network 70 a SONET/SDH (Synchronous Optical NETwork/Synchronous Digital Hierarchy) transport network 72, a DWDM (Dense Wavelength Division Multiplexing)/SONET/SDH/ethernet transport network 74, and an Ethernet transport network 57 used for Layer 2 adjacent stretched clusters. The Ethernet transport network 57 interfaces the server clusters 51, 53 with their distributed instances 55 (also known as stretched clusters) of the PDC 28 and the SDC 30 specifically requiring Layer 2 connectivity between them. More specifically, the Ethernet Transport Network 106 interfaces core layers of the PDC server clusters 51, 53 with a core layer of the SDC server cluster 55.

The DWDM/SONET/SDH/ethernet transport network 74 interfaces the CMDC back end 62 of the CMDC 50 with the SDC back end 68 of the SDC 30. The EMDC back end 56 may also be interfaced with the SDC back end 68 via DWDM/SONET/SDH/ethernet transport network 74 without departing from the scope of the present invention.

The SONET/SDH/ethernet transport network 72 facilitates interconnecting the first campus-core layer 34 with the second campus-core layer 40. The SONET/SDH/Ethernet transport network 72 may also act as an interface between the CMDC back end 62 and the SDC back end 68 for Fibre Channel (FC) connectivity.

The metro optical network 70 also acts as an interface between the first campus core-layer network 34 and the second campus core-layer network 40. The metro optical network 70 may be implemented via 10 Gigabit Ethernet (10 GE) technology.

One or more of the interconnect modules 70-74 of the DCI 32 may be omitted or replaced with another type of interconnect module without departing from the scope of the present invention.

The extranet 14 includes an extranet server-farm network 76, which includes one or more switches that are connected to the first campus core-layer network 34. Similarly, the EIE 16 includes an EIE server-farm network 78 with one or more switches for communicating with the secondary site campus core-layer network 40.

Various interconnect technologies employed to interconnect modules and networks of the network architecture 10 are application-specific. The interconnect technologies may readily be selected by those skilled in the art with access to the present teachings without undue experimentation.

In the present specific embodiment, the network architecture 10 selectively employs Geographically Dispersed Parallel Sysplex (GDPS), 10/100/1000 Gigabit Ethernet (GE), 10 GE, IBM Fibre channel Fiber CONnection (FICON), and basic GE interconnection technologies. For example, the extranet 14 is connected to the primary site campus core-layer network 34 via one or more 10 GE links and is connected to the ISPs 18, 20 via any Wide Area Network connection technology. The EIE 16 is connected to the secondary site campus core-layer network 40 via basic GE connection technology and is connected to the ISPs 18, 20 via high bandwidth connection technology. The DWDM/SONET/SDH/ethernet transport network 74 employs a combination of GE, Fibre channel, and 10/100/1000 GE technologies to interconnect the CMDC back end 62 and the SDC back end 68. The SONET/SDH transport network 72 employs Fibre channel technology to interconnect the CMDC back end 62 and the SDC back end 68 and employs GE technology to interconnect the campus core-layer networks 34, 40. The metro optical network 70 employs 10 GE technology to interconnect the campus core-layer networks 34, 40. The first campus-core network 34 is connected to the DC core 46 of the PDC 28 via 10 GE technology. The second campus core-layer network 40 is connected to the SDC front end 64 of the SDC 30 via GE technology. The data-center core 46 of the PDC connects to the EMDC 48 and the CMDC 50 via 10 GE technology. Technologies employed to interconnect various modules of the EMDC 48, CMDC 50, and SDC 30 are discussed more fully below. The WAN 38 interconnects the campus core-layer networks 34, 40 via 10/100/1000 GE technology.

In the present embodiment, the WAN 38 is employed as the primary path for user traffic destined for the server farms 54, 60, 66 from either primary or secondary sites. Domain Name Service (DNS) and Route Health Injection (RHI) are employed to control the granularity of applications and the state of distributed application environments.

In operation, the network architecture 10 provides a template that facilitates building data centers and accompanying interconnecting networks. The architecture 10 provides for a highly flexible and scaleable server farm environment and facilitates incorporating intelligent services that are optimized for improved security and reliability. A method for configuring a network that is adapted for use with the architecture 10 is discussed more fully below. Furthermore, the exact nature of the way intelligent services are incorporated (i.e. incorporated into the aggregation layer and integrated within layer-3 switches) is discussed more fully below.

Figure 2:
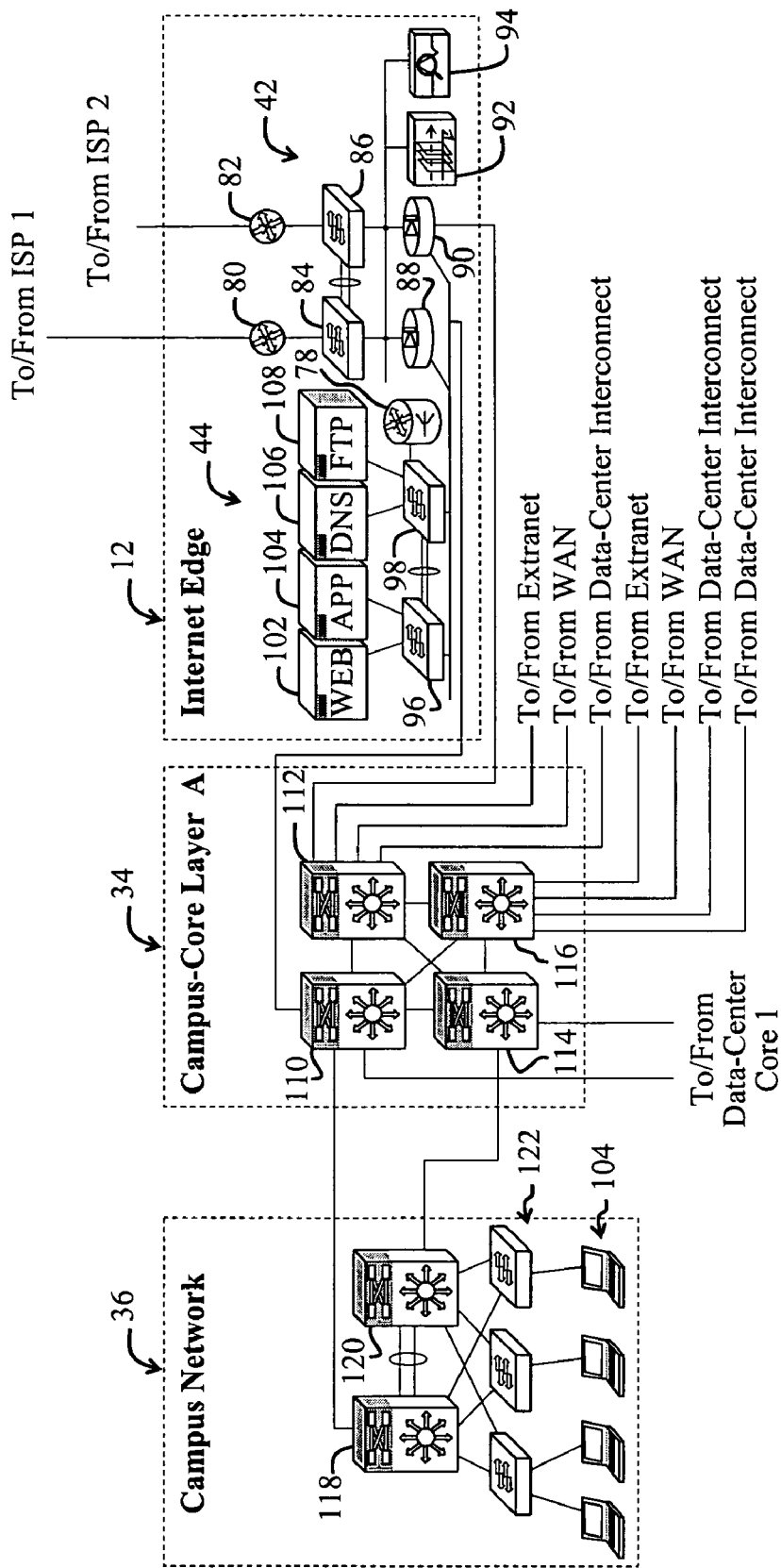
FIG. 2 is a more detailed diagram of the Internet edge, first campus-core layer, and campus network of FIG. 1.

FIG. 2 is a more detailed diagram of the Internet-edge network 12, the first campus-core layer 34, and campus network 36 of FIG. 1. The Internet-edge network 12 includes a first Internet-edge router 80 that is connected to the first ISP 18 of FIG. 1 and a second Internet-edge router 82 that is connected to the second ISP 20 of FIG. 1. The first Internet-edge router 80 is connected to a first layer-2 switch 84. The second Internet-edge router 82 is connected to a second layer-2 switch 86. The layer-2 switches 84, 86 are interconnected. Outputs of the layer-2 switches 84, 86 are connected to a first firewall 88 and a second firewall 90, respectively. A Cisco Guard XT module 92 and an anomaly-detector network analysis module 94 are connected between the layer-2 switches 84, 86 and the corresponding firewalls 88, 90 via a common interconnect that may be implemented via Gigabit Ethernet (GE) technology. The Cisco Guard XT module 92 provides unprecedented levels of protection against complex and otherwise elusive Denial-Of-Service (DOS) attacks.

The two edge routers 80, 82 providing redundant connectivity to the Internet 22. The layer-2 switches 84, 86 provide switching infrastructure to support one or more Internet-facing server farms 44 and various of edge services, such as firewalls 84, 86, global site selection 78, guarding 92, and network analysis and monitoring 94, and general Denial of Service (DOS) attack-detection and attack-mitigation services 42 that block or otherwise handle attacks originating from the Internet 22 and provide a so-called DeMilitarized Zone (DMZ) behind the attack-mitigation system 42. Additional edge services may include static content caching, content switching, intrusion detection, VPN termination (IPSEC and/or SSL), SSL offloading, and so on, as discussed more fully below with reference to FIG. 13. Additional or fewer services may be incorporated in the IE 12 without departing from the scope of the present invention. The exact locations within the IE 12 where the various services are implemented is application-specific and may be determined by those skilled with access to the present teachings to meet the needs of a given application without undue experimentation.

The various network elements 80-94 together comprise the attack-mitigation system 42. The server farm 44 is connected to the Internet-edge network 12 behind the firewalls 88, 90 in the DMZ via a second pair of layer-2 switches, which include a first server-farm switch 96, and a second server-farm switch 98. The server-farm switches 96, 98 provide redundant connectivity the Internet Edge server farm. A Global Site Selector (GSS) 78 is connected to the second layer-2 switch 98. The GSS 78 represents an instance of service-appliance intelligence incorporated at the server-farm switch 98. The GSS 78 may be connected directly to the server-farm switch 98.

The GSS 78 provides site-selection services employed to implement disaster-recovery functionality. The GSS 78 also facilitates traffic load balancing between geographically distributed data centers, such as the SDC 30 and the PDC 28 of FIG. 1. The GSS 78 enables businesses to confidently deploy global Internet and Intranet applications knowing that users will be quickly routed to alternate data centers if needed. When deployed with other Server Load Balancers (SLBs), the GSS 78 performs certain key functions, including connecting clients to SLBs that support requested websites. The GSS 78 also continuously monitors the load and availability of SLBs in the accompanying network 10 of FIG. 1 and facilitates selecting the SLB that is most able to answer each client request. Strategic placement and use of the GSS 78 as shown in FIG. 2 may also facilitate improving DNS server responsiveness and may increase the fault tolerance and scalability of large websites and data centers.

In the present specific embodiment, the server farm 44 includes an edge web server 102 and an application server 104, which are connected to the first edge switch 96. The server farm 44 also includes a Domain Name Service (DNS) server 106 and File Transport Protocol (FTP) server 88, which are connected to the second edge switch 98. The firewalls 88, 90 and edge switches 96, 98 are connected via a common interconnect that may be implemented via 10/100/1000 GE technology.

The first campus-core layer 34 includes a first core multilayer switch 110 that is multi-homed with a second core multilayer switch 112, a third core multilayer switch 114, and a fourth core multilayer switch 116. Each of the four core multilayer switches 110-116 are multi-homed with the three other switches. The multilayer switches 110-116 are fully meshed.

For the purposes of the present discussion, a network element is said to be dual homed if the network element is connected to two switches so that if one switch fails, the other switch may be employed. Similarly, a network element is the to be multi-homed if the element is connected to at least three other switches so that if one or more of the three switches fails, another switch is available to compensate as needed. A network is a collection of intercommunicating devices or modules.

Service-module intelligence represents functionality that is implemented via service modules, such as firewall, content-switching, Secure Socket Layer (SSL), Virtual Private Network, Guard XT, and anomaly detector modules.

A multilayer switch is a switch adapted to operate in accordance with layer 2, layer 3, or higher functions, where such functions are defined by the OSI (Open Systems Interconnection) standard.

The first core multilayer switch 110 is further connected to the Internet-edge network 12 behind the firewalls 88, 90. The second core multilayer switch 112 is connected to the Internet-edge network 14 behind the second Internet-edge firewall 90.

The campus network 36 includes a first campus multilayer switch 118, which is interconnected with a second campus multilayer switch 120. The campus multilayer switches 118, 120 are connected to core multilayer switches 110, 114, respectively, via a network-connection technology, such as 10 GE. The campus network 36 further includes plural layer-2 switches that are dual homed with the core multilayer switches 118, 120, which act as aggregation-layer switches. The plural layer-2 switches 122 are also connected to plural network nodes 124, which are computers 124 in the present illustrative embodiment.

With reference to FIGS. 1 and 2, the second core multilayer switch 112 is also connected to the extranet server-farm network 76 of the extranet 14, the WAN 38, and the metro optical network 70 of the DCI 32 via network-connections, such as 10 GE, 10/100/1000 GE, and 10 GE, respectively.

The first core multilayer switch 110 and the third core multilayer switch 114 are connected to the DC core 46 of the PDC 28 via 10 GE technology. The fourth core multilayer switch 116 is further connected to the extranet server-farm network 76, the WAN 38, and the metro optical network 70 of the DCI 32 via network-connections, such as 10 GE, 10/100/1000 GE, and 10 GE, respectively. The fourth core multilayer switch 116 is also connected to the SONET/SDH transport network 72 of the DCI 32 via a standard-rate GE connection.

In operation, the attack-mitigation system 42 performs Distributed Denial Of Service (DDOS) attack mitigation at the Internet edge 12. The anomaly detector 94 and the Guard XT 92 are strategically placed in the militarized zone in front of the firewalls 88, 90 and act to detect and mitigate high volume attack traffic by diverting through anti-spoofing and attack-specific dynamic filter counter-measures.

The GSS 78, which is placed in the DMZ behind the firewalls 88, 90 prevents DNS traffic from penetrating edge security boundaries. Those employing the architecture 10 of FIG. 1 to implement a network may implement the Internet-facing server farm 44 in accordance with the same best practices used in conventional intranet server farms, with specific scalability and security requirements driven by the size of the target user population.

The first campus-core layer 34 provides an interconnection exchange between major network components, such as the EIE 16, extranet 14, Internet-edge network 12, the campus network 36, and the WAN 38 of FIG. 1. The first campus-core layer 34 is fully meshed to provide high speed layer-3 connectivity between the various network components.

Figure 3:
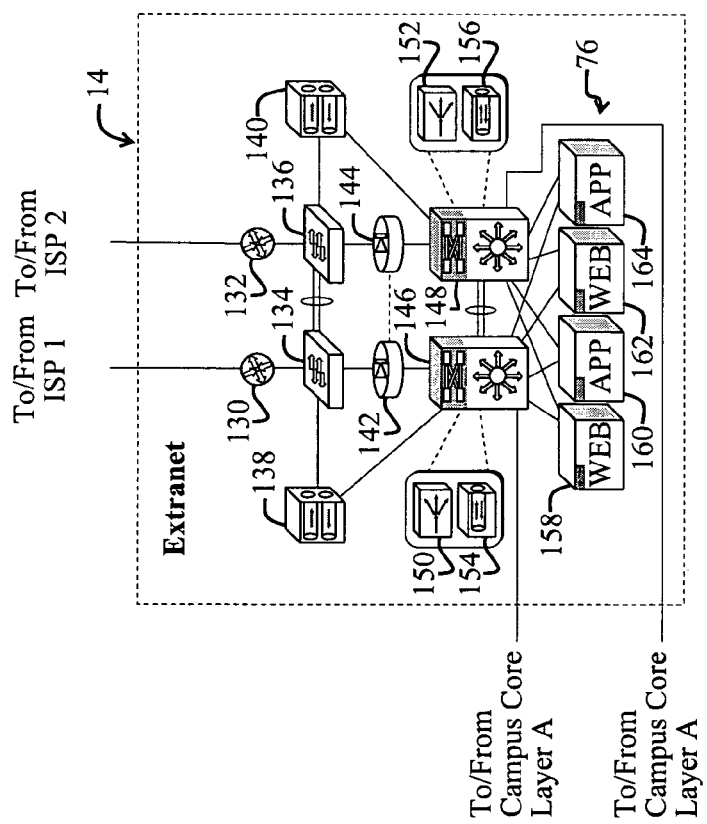
FIG. 3 is a more detailed diagram of the extranet of FIG. 1.

FIG. 3 is a more detailed diagram of the extranet 14 of FIG. 1. The extranet 14 includes a first extranet edge router 130 and a second extranet edge router 132, which connect the extranet 14 to the first ISP 18 and the second ISP 20 of FIG. 1, respectively. The first edge router 130 and the second edge router 132 are also connected to a first extranet layer-2 switch 134 and a second extranet layer-2 switch 136, respectively. The layer-2 switches 134, 136 are an interconnected pair. The extranet layer-2 switches 134, 136 are further connected to a first VPN concentrator 138 and a second VPN concentrator 140, respectively, and to a first extranet firewall 142 and a second extranet firewall 144, respectively. The firewalls 142 may intercommunicate. The first extranet firewall 142 and the second extranet firewall 144 are connected to a first extranet multilayer switch 146 and a second extranet multilayer switch 148, respectively. Similarly, the first VPN concentrator 138 and the second VPN concentrator 140 are connected to the first extranet multilayer switch 146 and the second extranet multilayer switch 148, respectively.

The VPN concentrators 138 represent instances of service-module intelligence integrated at the aggregation-layer switches 134, 136. The VPN concentrators 138 facilitate creating VPNs by creating secure connections across networks, such as the Internet 22 of FIG. 1, that appear as a private connections to users of the VPNs.

Additional instances of service-module intelligence include a primary content-switching service module 150 and a secondary content-switching service module 152, which are connected to the first multilayer switch 146 and the second multilayer switch 148, respectively. The multilayer switches 146, 148 also incorporate, are integrated with, or are otherwise connected to a first Secure Socket Layer (SSL) service module 154 and a second SSL service module 156, respectively. The SSL modules 154, 156 also represent instances of service-module intelligence incorporated at with the extranet multilayer switches 146, 148. The SSL modules 154 facilitate encrypting communications between the ISPs 18, 20 of FIG. 1 and users of the extranet 76.

The multilayer switches 146, 148 communicate with servers of the extranet server farm 76, which include a first extranet web server 158, a first application server 160, a second web server 162, and a second application server 164, which are each dual homed with the multilayer switches 146, 148.

The extranet 14 represents a highly scalable network that provides a secure termination point for IPSec (Internet Protocol Security) and SSL (Secure Socket Layer) VPNs to support business-partner connectivity. The exact design and construction of the extranet server farm 76 is application-specific. When implementing the extranet 14, one may modify the extranet 14 to meet the scalability and security needs of a given application according to intranet-server-farm-design best practices without departing from the scope of the present invention.

By enabling IPSec via one or more of the service modules 150-156, data may be transmitted across a public network without fear of observation, modification, or spoofing. This enables various applications, such as VPNs, including intranets, extranets, and remote user-access networks. IPSec also provides data authentication and anti-replay services in addition to data confidentiality services. IPSec intelligent services may be replaced with other service-module intelligence, such as that provided by Cisco Encryption Technology (CET), without departing from the scope of the present invention.

Figure 4:
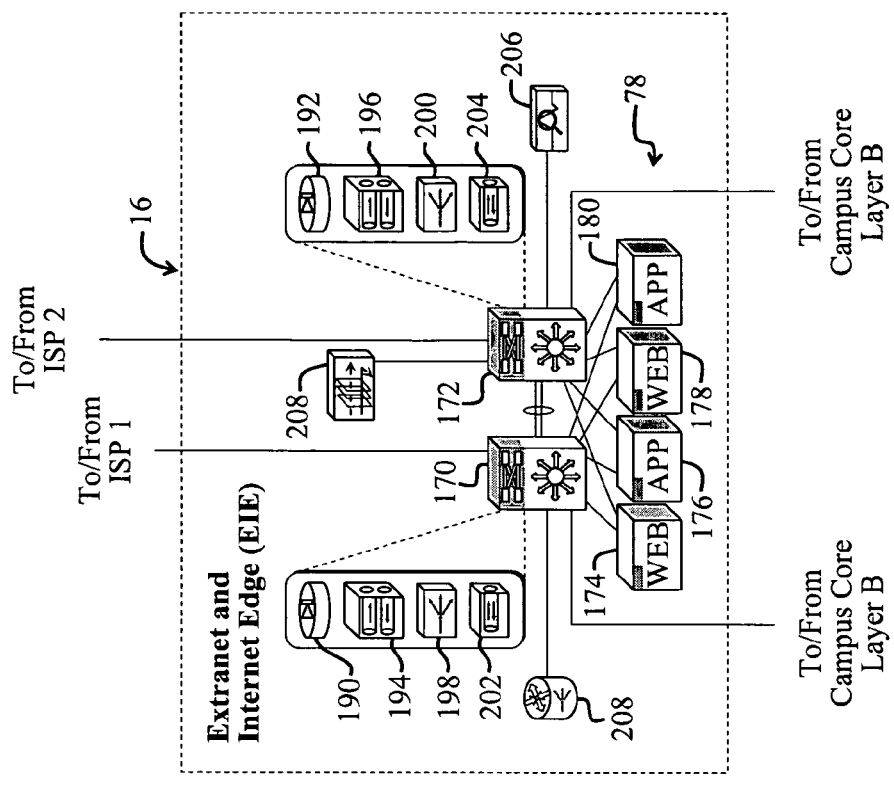
FIG. 4 is a more detailed diagram illustrating the combined extranet and Internet edge of FIG. 1 located in the secondary data center.

FIG. 4 is a more detailed diagram illustrating the combined Internet Edge and Extranet (EIE) 16 of FIG. 1. The EIE 16 includes an aggregation layer that includes a first EIE multilayer router 170 and a second EIE multilayer router 172, which are interconnected via Ether Channel®, port channel, or other interconnection technology. The multilayer routers 170, 172 communicate with servers of the server farm 78, which include a first web server 174, a first application server 176, a second web server 178, and a second application server 180. The servers 174-180 are dual homed with the interconnected EIE multilayer switches 170, 172. More or fewer servers and different types of servers other than those shown in the figures, including FIG. 4, may be included in various server farms disclosed herein without departing from the scope of the present invention.

The EIE multilayer switches 170, 172 incorporate various instances of service-module intelligence, including a first firewall module 190, a first VPN concentrator 194, a first content-switching module 198, and a first SSL module 202, which are integrated within the first multilayer switch 170. A second firewall module 192, a second VPN concentrator 196, a second content-switching module 200, and a second SSL module 204, are incorporated within the second multilayer switch 172. The second EIE multilayer switch 172 is also directly connected to various appliances, including an EIE anomaly detector 206 and an EIE Cisco Guard XT module 208. The first EIE multilayer switch 170 is connected to an EIE Global Site Selector (GSS) 208. Use of the embedded service-module intelligence 190-208 enables a collapsed highly centralized and integrated Internet-edge and extranet design. Functions like site selection and caching that are also part of edge-layer services, are offered through appliances in the present specific embodiment.

Figure 5:
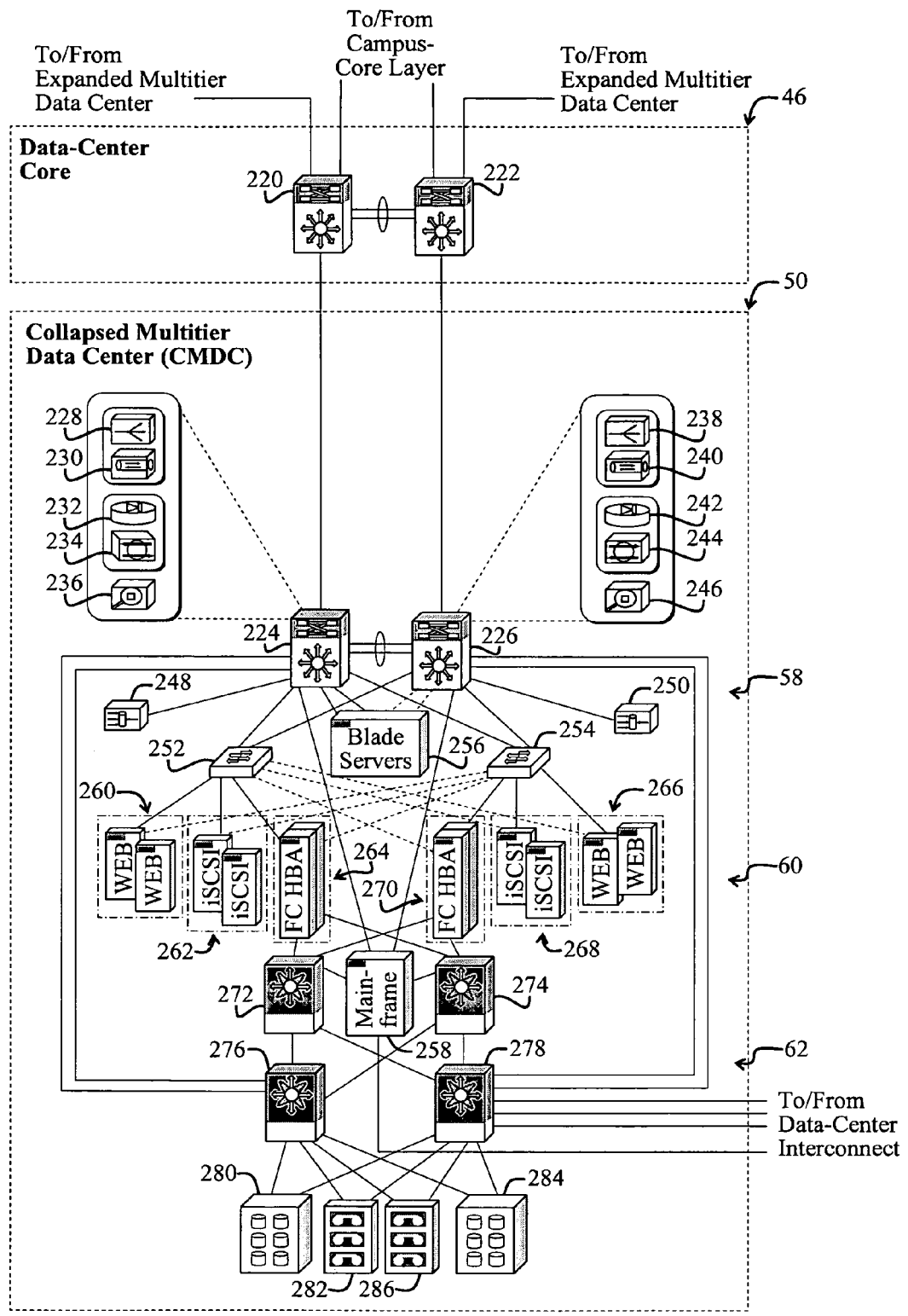
FIG. 5 is a more detailed diagram illustrating the collapsed multitier data-center network and accompanying data-center core incorporated within the large-scale primary data center of FIG. 1.

FIG. 5 is a more detailed diagram illustrating the Collapsed Multitier Data-Center (CMDC) network 50 and accompanying data-center core 46 incorporated within the large-scale Primary Data Center (PDC) 28 of FIG. 1. The data-center core 46 includes a first core multilayer switch 220 connected to a second core multilayer switch 222. The multilayer switches 220, and 222 each connect corresponding multilayer switches of the campus-core layer 34 of FIGS. 1 and 2, the Expanded Multitier Data Center (EMDC) 48 of FIG. 1, and the CMDC 50. In particular, the first core multilayer switch 220 is connected to a first aggregation-layer multilayer switch 224 and to a second aggregation-layer multilayer switch 226 of the CMDC 50.

The aggregation-layer multilayer switches 224, 226 are interconnected via a trunk, Ether Channel®, port channel, or other connection. The switches 224, 226 are connected together so that they act as a logical unit. Furthermore, if one of the switches 224, 226 fails, the remaining switch can sufficiently compensate to prevent failure of the CMDC 50. The aggregation-layer multilayer switches 224, 226 each incorporate redundant intelligent services, which are implemented via a first set of service modules and a second set of service modules, respectively. The first set of service modules includes a first CMDC content-switching module 228, an SSL module 230, a firewall 232, an intrusion-detection module 234, an anomaly detector 236, and a first CMDC content-module appliance 248. Similarly, the second set of service modules that are integrated with the second aggregation-layer multilayer switch 226 includes a second CMDC content-switching module 238, an SSL module 240, a firewall 242, an intrusion-detection module 244, and an anomaly detector 246, and a first CMDC content-module appliance 250.

The pair of multilayer switches 224, 226 are each connected to a first CMDC layer-2 switch 252, a second CMDC layer-2 switch 254, and a set of blade servers 256 using the integrated Ethernet Fabric. The multilayer switches 224, 226, the layer-2 switches 252, 254, and the blade servers 256 are considered part of the CMDC front end 58 for the purposes of the present discussion. The multilayer switches 224, 226 are further connected to a mainframe computer 258. The layer-2 switches, the blade servers 256, and the mainframe computer 258 are dual homed with the multilayer switches 224, 226.

The multilayer switches 224, 226 are the to facilitate implementing an aggregation layer since plural links between various additional modules, such as the layer-2 switches 252, blade servers, and so on, are aggregated at the switches 224, 226. Link aggregation provides a standards-based mechanism for LAN switch ports and high end server network interface cards to be grouped together to achieve a linear increase in bandwidth and to facilitate providing redundancy to the network, making it resilient to failures and enabling sharing of traffic loads across links.

For the purposes of the present discussion, a link may be any connection between physical network ports on one or more systems. Link aggregation allows plural links to be bundled, i.e., aggregated to form a group, called a link-aggregation group, in such a way that a MAC (Media access control) client can treat the group as a single link. According to the Open Systems Interconnect (OSI) standard, the link-aggregation layer is a sub-layer of the data-link layer.

The layer-2 switches 252 and 254 are each connected to plural groups of servers 60 that form the server farm 60. The server farm 60 includes a first group of web servers 260, a first group of iSCSI (internet Small Computer System Interface) servers 262, a first group of Fibre channel Host Bus Adapter (FC HBA) servers 264, which are dual homed with the first layer-2 switch 252 and the second layer-2 switch 254, the latter acting as a back-up to the first layer-2 switch 252. The server farm 60 further includes a second group of web servers 266, a second group of iSCSI servers 268, and a second group of FC HBA servers 270, which are dual homed with the second layer-2 switch 254 and the first layer-2 switch 252, the latter acting as a back-up to the second layer-2 switch 254.

The various servers 260-270 of the server farm 60 are grouped according to function via LAN technology implemented via one or more of the switches 224, 226, 252, 254 and accompanying service modules 228-246. The VPNs used to group the servers of the server farm 60 may be implemented via software and/or hardware maintained at other network locations without departing from the scope of the present invention.

The FC HBAs attached hosts 264, 270 are each connected to a first CMDC multilayer director 272 and to a second CMDC multilayer director 274, which form part of the CMDC back end 62. The multilayer directors 272, 274 are connected to the mainframe computer 258, which is also connected to the DWDM/SONET/SDH/ethernet transport network 74 of the DCI 32 of FIG. 1 via a suitable connection technology, such as Geographically Dispersed Parallel Sysplex (GDPS) technology available from IBM. Mainframe connections to the multilayer switches 224, 226 are implemented via 10/100/1000 GE technology in the present specific embodiment.

The CMDC back end further includes a third CMDC multilayer director 276 and a fourth CMDC multilayer director 278, which are dual homed with the first and second multilayer directors 272, 274. The third multilayer director 276 and the fourth multilayer director 278 are also directly connected to the first multilayer switch 224 and the second multilayer switch 226 via GE connection technology, respectively. In the present specific embodiment, the fourth multilayer director 278 is further connected to the SONET/SDH transport network 72 of the DCI 32 of FIG. 1 via a Fibre channel link and is further connected to the DWDM/SONET/SDH/ethernet transport network 74 of the DCI 32 of FIG. 1 via a GE link and a Fibre channel link.

The CMDC back end 62 acts as a Storage Area Network (SAN), which for illustrative purposes further includes a first Fibre channel disk subsystem 280, a first Fibre channel tape array 282, a second Fibre channel disk subsystem 284, and a second Fibre channel tape array 286. The exact number and types of storage devices 280-284 is application specific and may adjusted and scaled according to the needs of a given application.

The construction of the CMDC network 50 follows certain key principles. In particular, VLANs, Virtual SANs (VSANs) and instances of service-module intelligence 228-250 are employed to separate server groups and apply network policy independently to each server group 260-270. The ethernet sides of the blade servers 256 are connected directly to the multilayer switches 224, 226, and the HBAs 264, 270 are connected to the multilayer directors 272, 274 via pass-through technology. Layer-2 aggregation switches 252, 254 are connected to the multilayer fabric directors 272, 274 via the FC HBAs 264, 270, thereby allowing the iSCSI hosts 262, 268 to access the storage resources 280-286. For the purposes of the present discussion, a fabric comprises one or more switches and network elements interconnected in a SAN.

Port channel technology in the SAN fabric is employed to increase path redundancy and to improve recovery times from link failure. Fabric Shortest Path First (FSPF) methodology is employed to facilitate equal-cost load balancing through redundant paths. Storage virtualization is employed to pool distinct physical storage arrays 280-286 into one logical array, thereby hiding physical details, such as spindle information, Logical Unit Numbers (LUNs), and so on.

Figure 6:
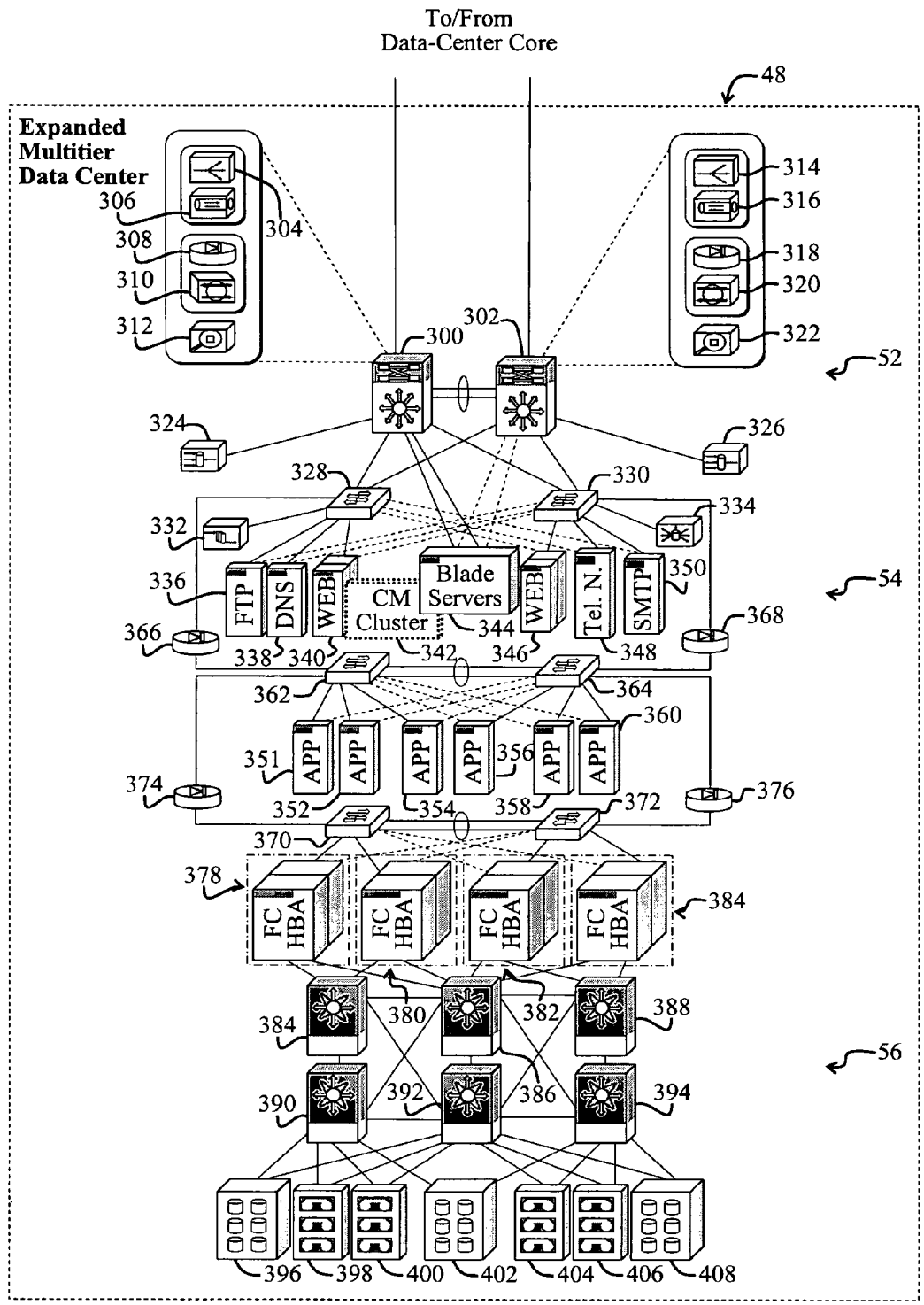
FIG. 6 is a more detailed diagram illustrating the expanded multitier data-center network incorporated within the large-scale primary data center of FIG. 1.

FIG. 6 is a more detailed diagram illustrating the Expanded Multitier Data-Center (EMDC) network 48, which is incorporated within the Primary Data Center (PDC) 28 of FIG. 1. The front end 52 of the EMDC network 48 is similar to the front end 58 of the CMDC network of FIG. 5. In particular, the EMDC front end 52 includes a first EMDC multilayer switch 300 and a second multilayer switch 302 which are connected to the first core multilayer switch 220 and the second core multilayer switch 22 of the data-center core 46 of FIGS. 1 and 5. The first EMDC multilayer switch 300 incorporates service modules 304-312, which correspond to the service modules 228-236 of FIG. 5. Similarly, the second EMDC multilayer switch 302 incorporates service modules 314-322, which correspond to the service modules 238-246 of FIG. 5. The first EMDC multilayer switch 300 and the second EMDC multilayer switch 302 are connected to a first content engine 324, a second content engine 326, a first layer-2 switch 328, and a second layer-2 switch 330. The layer-2 switches 328 and 330 are considered access layer switches, and the multilayer switches 300, 302, are considered aggregation switches, which incorporate additional service-module intelligence, represented graphically via a video-broadcast server 332 and a content distribution manager 334.

The server farm 54 includes a first set of servers that includes a EMDC FTP server 336, a DNS server 338, a first EMDC web server 340, a Call Manager (CM) cluster 342, a second EMDC web server 346, a telnet server 348, and a EMDC SMTP server 350, which are dual homed with the first and second layer-2 switches 328, 330. A set of blade servers 344 is dual homed with the multilayer switches 300, 302. The CM cluster 342 may be implemented via a separate server or incorporated within one of the servers 336-350.

The EMDC server farm 54 includes a second set of servers that include plural application servers 351-360, which are dual-homed with a third layer-2 switch 362 and a fourth layer-2 switch 364. The third and fourth layer-2 switches 362, 364 are connected to the first layer-2 switch 328 and the second layer-2 switch 330 via a first EMDC firewall 366 and a second EMDC firewall 368, respectively.

A fifth layer-2 switch 370 and a sixth layer-2 switch 372 are connected to the third layer-2 switch 362 and the fourth layer-2 switch 364 through a third firewall 374 and a fourth firewall 376, respectively. The EMDC back end 56 includes plural groups of FC HBAs including a first group of FC HBAs 378, a second group of FC HBAs 380, a third group of FC HBAs 382, and a fourth group of FC HBAs 384. Each FC HBA of the groups of FC HBAs 378-384 are dual homed with the fifth and sixth layer-2 switches 370, 372. The groups FC HBAs 378-384 are grouped according to function via VLANs and/or Virtual Storage Area Networks (VSANs), which may be implemented via hardware and/or software routines running on one or more of the elements or service modules of the EMDC network 48.

The EMDC back-end storage network 56 further includes plural multilayer directors 384-394, including a first EMDC multilayer director 384, a second multilayer director 386, a third multilayer director 388, a fourth multilayer director 390, a fifth multilayer director 392, and a sixth multilayer director 394. Each of the EMDC multilayer directors 384-394 are triple homed with three other multilayer directors so that each pair of multilayer directors is fully meshed with each adjacent pair.

The first EMDC multilayer director 384 is connected to FC HBAs hosts of the first group of FC HBAs hosts 378 and to FC HBAs hosts of the second group of FC HBAs 380 host. The second EMDC multilayer director 386 is linked with FC HBAs host of all of the groups of FC HBAs 378-384 hosts. The third multilayer director 388 is linked with FC HBAs host of the third group of FC HBAs 382 hosts and FC HBAs hosts of the fourth group of FC HBAs hosts.

The EMDC back-end storage network 56 further includes plural storage devices 396-408, which for illustrative purposes is shown including a first EMDC Fibre channel disk subsystem 396, a first Fibre channel tape array 398, a second Fibre channel tape array 400, a second Fibre channel disk subsystem 402, a third Fibre channel tape array 404, a fourth Fibre channel tape array 406, and a third Fibre channel disk subsystem. The storage devices 396-400 are connected to both the fourth multilayer director 390 and the fifth multilayer director 392. The second Fibre channel disk subsystem 402 is connected to the fourth multilayer director 390 and the sixth multilayer director 394. The storage devices 404-408 are connected to both the fifth multilayer director 392 and the sixth multilayer director 394. The storage arrays and tape subsystems are representative of devices connected to the Fibre-Channel fabric and therefore could change in quantity and connectivity options.

The construction of the EMDC network 50 follows certain key principles. In particular, one of the multilayer aggregation switches 300, 302 is selected as the primary default gateway and Spanning-Tree Protocol (STP) root. The other redundant multilayer aggregation switch (300 or 302) is set as the secondary default gateway and secondary root. Hot Standby Routing Protocol (HSRP) and Rapid Per-VLAN Spanning Tree (RPVST) are employed as the primary default gateway and STP protocols, respectively. HSRP provides N+1 redundancy to critical gateway devices and services and enables dynamic sharing of IP addresses. Use of STP may improve switched-network reliability, manageability, and security, especially when employed with the Cisco root-guard, Loop-guard, and BPDU guard features.

Access-layer switches 328, 330, 362, 364, 370, 372 are deployed in pairs to enable server dual homing, wherein each server of the server farm 54 may connect to two switches and or distribution-layer routers 300, 302 rather than one. Various aggregation-layer switches 300, 302 and access-layer switches 328, 330, 362, 364, 370, 372 may be connected via trunks or other technologies. All access-layer VLANs corresponding to the FC hosts groups 378-384 are carried on every trunk to improve flexibility and scalability of the server farm 54.

Firewalls 366, 368, 374, 376 are employed to control traffic paths between tiers of servers and to isolate distinct application environments. Content switches 324, 226 are employed to monitor and control server and application health and to distribute traffic load between clients and the server farm 54 and between server and application-server tiers (servers 336-350 and 351-360, respectively) of the server farm 54.

Access switches 362, 364, 370, 372 used in application and back-end segments may be directly connected through Ether Channel® connections. VLANs may be employed to separate groups of servers by function or application type. VSANs may be employed to group isolated fabrics into a shared infrastructure while keeping their dedicated fabric services, security, and stability integral. Hosts may be connected to the back-end SAN 56 using via the FC HBAs on isolated VSANs 378-384.

Figure 7:
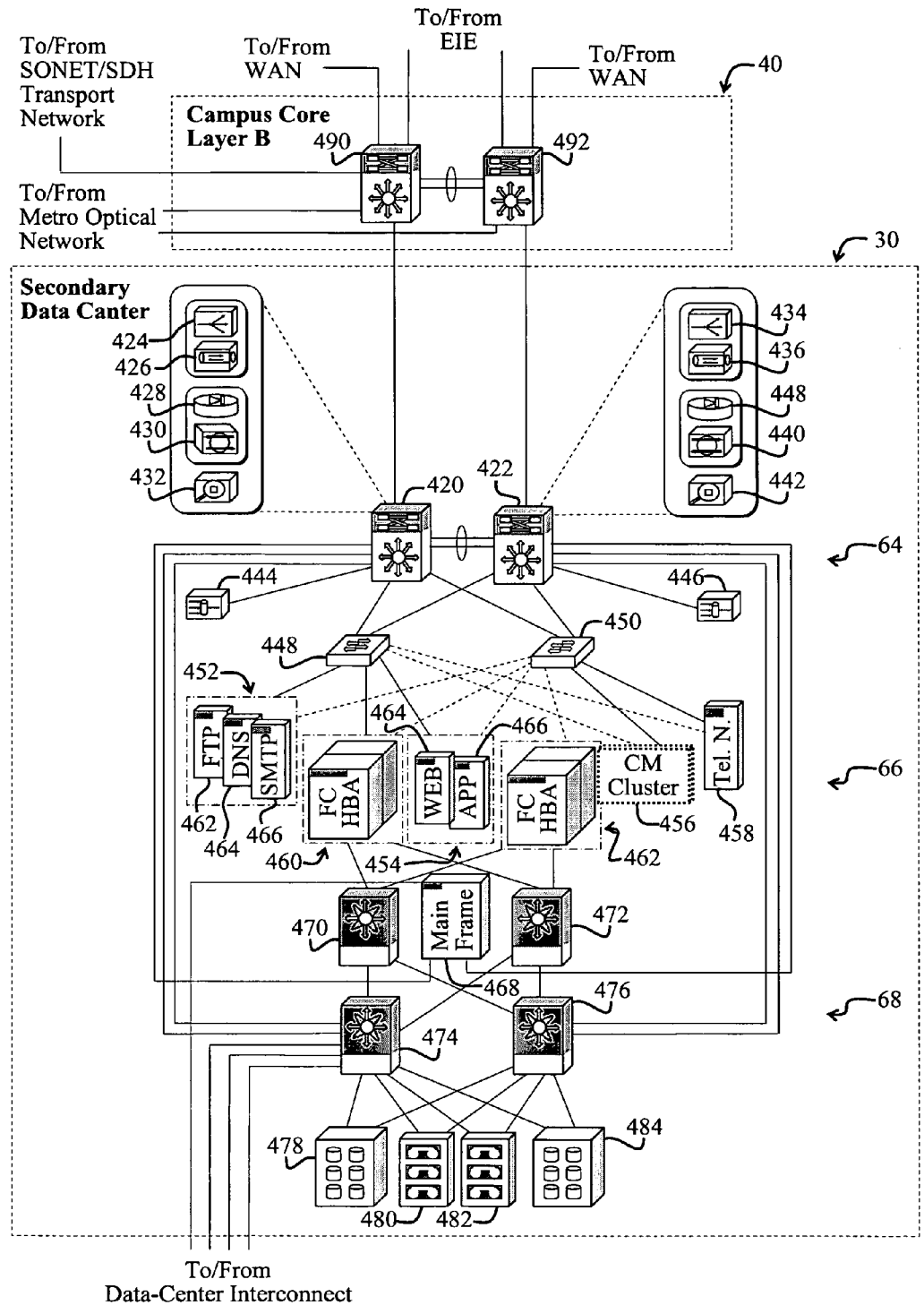
FIG. 7 is a more detailed diagram illustrating the secondary data center and the second campus-core layer of FIG. 1.

FIG. 7 is a more detailed diagram illustrating the Secondary Data Center (SDC) 30 and secondary site campus-core layer 40 of FIG. 1. The SDC front end 64 is similar to the CMDC front end 58 of FIGS. 1 and 5 and the EMDC front end 52 of FIGS. 1 and 6. In particular, the SDC front end 64 includes a first SDC multilayer aggregation switch 420, which is interconnected to a second multilayer aggregation switch 422. The first multilayer switch 420 and the second multilayer switch 422 incorporate service modules 424-432 and service modules 434-442, respectively, which correspond to service modules 228-236 and service modules 238-246, respectively, of the CMDC 50 of FIG. 5.

The SDC multilayer switches 420, 422 communicate with interconnected campus-core multilayer switches 490, 492, respectively, of the second campus-core layer 40. The first campus-core multilayer switch 490 further communicates with the WAN 38, the metro optical network 70, the EIE 16, and the DWDM/SONET/SDH/ethernet transport network 74 of FIG. 1. The second campus-core multilayer switch 492 further communicates with the metro optical network 70, the WAN 38, and the EIE 16 of FIG. 1. Such connections may be implemented via various types of ethernet technologies, such as 10/100/1000, 10 GE, and GE.

The SDC multilayer switches 420, 422 further communicate with a first content engine 444 and a second content engine 446, respectively. The SDC front end 64 further includes a first layer-2 switch 448 and a second layer-2 switch 450, which connected to both SDC multilayer switches 420, 422.

The server farm 66 includes plural groups of servers 452-456, a telnet server 458, a first SDC FC HBA host 460, and a second SDC FC HBA host 462. The modules and server groups 452-462 are grouped via VLAN and VSAN technology. Those skilled in the art with access to the present teachings may readily perform such groupings without undue experimentation.

For illustrative purposes, the first group of servers 452 is shown including a File Transport Protocol (FTP) server 462, a Domain Name Server (DNS) server 464, and a Simple Mail Transport Protocol (SMTP) server 466. The second server group 454 includes an SDC web server 464 and application server 466. The third group of servers 456 represents a Call Manager (CM) cluster 456. Each of the various modules and servers of the server groups 452-462 are dual-homed to both the first SDC layer-2 switch 448 and the second SDC layer-2 switch 450.

In the present specific embodiment, the second group of servers 454 is further connected to both the first SDC multilayer switch 420 and the second SDC multilayer switch 422 and to an SDC mainframe computer 468. The connections may be performed via various connection technologies, such as 10/100/1000 GE technology. The mainframe 468 is further connected to the DWDM/SONET/SDH/ethernet transport network 74 of the DCI 32 of FIG. 1 via a suitable connection technology, such as IBM Geographically Dispersed Parallel Sysplex (GDPS) technology.

The SDC back-end 66 includes a first SDC multilayer director 470, a second SDC multilayer director 472, a third SDC multilayer director 474, and a fourth SDC multilayer director 476. The SDC multilayer directors 470-476 are dual homed with each other, offering a direct path from the servers to the storage devices. The meshed configuration improves reliability and scalability of the SDC 30.

The FC hosts of group 464 or 466 are connected to both the Ethernet access layer switches, and Fibre-channel edge layer directors. Each server is dual-homed to the redundant access switches and the redundant edge directors.

In the present specific embodiment, the third SDC multilayer director 474 and the fourth SDC multilayer director 476 are connected directly to the first SDC multilayer switch 420 and the second SDC multilayer switch 422, via gigabit ethernet technology. This connection permits the communication between Ethernet connected hosts to the storage devices in the SAN environment. The SDC back-end storage network 68 further includes storage devices 478-484, which include a first Fibre channel disk subsystem 478, a first Fibre channel tape array 480, a second Fibre channel tape array 482, and a second Fibre channel disk subsystem 484. The storage devices 478-484 are each connected to both the third SDC multilayer director 474 and the fourth multilayer director 476. These storage devices provide a backup configuration for the same type of devices located in the primary data center.

The third SDC multilayer director 474 is further connected to the DWDM/SONET/SDH/ethernet transport network 74 and the SONET/SDH transport network 72 of the DCI 32 of FIG. 1 via FC CON (Fibre channel CONnection) technology. The third SDC multilayer director 474 maintains an additional connection to the DWDM/SONET/SDH/ethernet transport network 74 via GE connection technology. This connectivity option allows the data replication process from the primary site to the secondary site to take place.

In the present specific embodiment, the SDC 30 acts as a back-up location that houses critical standby transactional applications (with recovery ranges from near zero or very low Recovery Point Objective (RPO) and Recovery Time Objective (RTO) to minutes) and redundant active non-transactional applications (with RPO and RTO in the 12-24 hours range). The SDC 30 may act as a smaller version of the PDC 28 that houses back-up application environments that support required operational business functions.

Various servers of the server farm 66 that perform related functions are grouped as need via VLANs. The specific rules used to perform the groupings are application specific and may readily be determined by one skilled in the art to meet the needs of a given application without undue experimentation. Selective grouping of servers via VLANs may facilitate managing security, SSL, load-balancing, and traffic-monitoring network policies. The servers are dual homed to different access switches 448, 450. One or more servers of the server farm 66 may not be dual homed with the access switches 448, 450 without departing from the scope of the present invention. However, in the preferred embodiment, any critical servers are dual homed or multihomed with plural access switches, such as the access switches 448, 450 of the SDC front end 64. Furthermore, any primary physical connections between access available access switches 448, 450 are staggered.

Group servers that provide like functions in the same VLANs to apply a consistent and manageable set of security, SSL, load balancing and monitoring policies. Dual-home critical servers to different access switches, and stagger the primary physical connections between the available access switches.

Port channels and trunks may be employed to aggregate physical Inter-Switch Links (ISL) in to one logical switch so that, for example, the connection between multilayer switches 420 and 422 is redundant and offer higher aggregate bandwidth. VSANs are employed to segregate multiple distinct SANs in a single physical fabric to consolidate isolated SANs and SAN fabrics. Storage virtualization is employed to further increase the effective storage utilization and connaturalize the management of multiple storage arrays 478-484 by creating a single pool of virtual storage from the multiple storage arrays and representing them as virtual disks to applications, such as applications running on the servers of the server farm 66.

Figure 8:
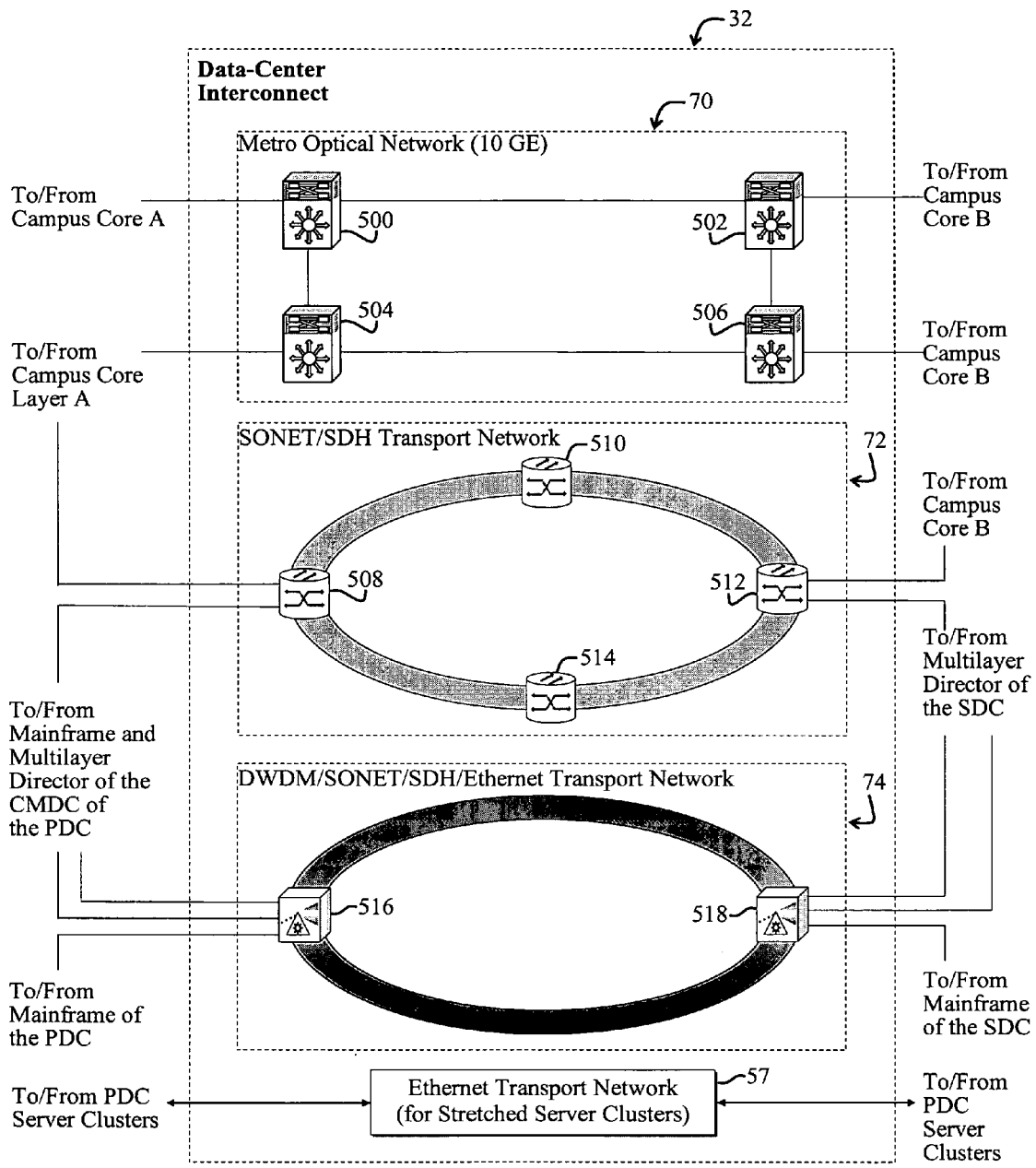
FIG. 8 is a more detailed diagram illustrating the data-center interconnect of FIG. 1.

FIG. 8 is a more detailed diagram illustrating the Datacenter interconnect 32 of FIG. 1. The metro optical network 70 is shown comprising a first DCI multilayer switch 500, which is connected to a second multilayer switch 502 and a third multilayer switch 504. A fourth multilayer switch 506 is connected to the second multilayer switch 502 and the third multilayer switch 504. The first DCI multilayer switch 500 is connected to the second core multilayer switch 112 of the campus-core layer 34 of FIG. 1 via 10 GE technology. The third DCI multilayer switch 504 is connected to the fourth core multilayer switch 116 of the campus-core layer 34 of FIG. 1 via 10 GE technology. The second DCI multilayer switch 502 and the fourth DCI multilayer switch 506 are connected to first and second multilayer switches (not shown), respectively, of the second campus-core layer 40 of FIG. 1. The second campus core layer 40 comprises two interconnected multilayer switches (not shown) similar to the data-center core 46 of FIGS. 1 and 5. The secondary site campus-core layer 40 of FIG. 1 may be implemented similarly to the primary site first campus-core layer 34 of FIG. 1 without departing from the scope of the present invention. In the present specific embodiment, the DCI multilayer switches 500-506 are interconnected via 10 GE links. The metro optical network 70 is a high-speed (10 GE) network suitable for transparent LAN services between distributed campus and data-center environments.

The SONET/SDH transport network 72 includes plural interconnected Multiservice Provisioning Platforms (MSPPs) 508-514, including a first MSPP 508, a second MSPP 510, a third MSPP 512, and a fourth MSPP 514, which are interconnected as needed for a particular implementation via SONET/SDH technology. The design and construction of suitable SONET/SDH transport networks, such as the network 72 are known in the art. One or more conventional SONET/SDH transport networks may be employed to implement embodiments of the present invention without departing from the scope thereof.

For illustrative purposes, with reference to FIGS. 1, 2, 5, 7, and 8, the first MSPP 508 is further connected to the fourth core multilayer switch 116 of first campus-core layer 34 via GE connection technology and is further connected to the fourth CMDC multilayer director 278 of the CMDC 50 of FIG. 5 via FICON connection technology. Furthermore, the third MSPP 512 is connected to the first campus-core multilayer director 490 of the second campus-core layer 40 via GE connection technology and is further connected to the third SDC multilayer director 474 of the SDC 30 of FIG. 7 via FICON connection technology.

The MSPPs 508-514, which may be implemented via ONS 15454 SDH MSPP modules, provide functions of multiple network elements in a single platform, including aggregation and transport services, GE transport, network support for rings, linear point-to-point, linear add/drop, star, and hybrid network topologies. The SONET/SDH transport network 72 is suitable for Fibre channel over IP (FCIP) technologies and may support voice, video, and additional IP traffic between distributed locations in a metro or long-haul environment.

The DWDM/SONET/SDH/ethernet transport network 74 is shown, for illustrative purposes, including a first Dense Wavelength Division Multiplexer (DWDM) 516 and a second DWDM 518, which are interconnected via DWDM, SONET, and/or SDH technologies. Exact details of the DWDM/SONET/SDH/ethernet transport network 74 are application specific and may be readily determined by those skilled in the art with access to the present teachings without undue experimentation.

In the present specific embodiment, the first DWDM 516 connects the DWDM/SONET/SDH/ethernet transport network 74 to the fourth CMDC multilayer director 278 of the CMDC 50 of FIG. 5 via FICON and GE links. The first DWDM 516 is further connected to the ainframe 258 of the CMDC 50 of FIG. 5 via one or more 10/100/1000 GE links.

The second DWDM 518 connects the DWDM/SONET/SDH/ethernet transport network 74 to the third SDC multilayer director 474 of the SDC 30 of FIG. 7 via FICON and GE links. The second DWDM 518 is further connected to the SDC mainframe 468 of FIG. 7 via 10/100/1000 GE connection technology.

The DWDM/SONET/SDH/ethernet transport network 74 supports high-speed low-latency uses, such as synchronous data replication between distributed disk subsystems. The common transport network 74 supports multiple protocols such as FC, GE, and ESCON (Enterprise System CONnection) concurrently.

SONET and SDH are physical layer standards for high-speed transport over both UTP (Unshielded Twisted-Pair) and fiber cabling. SONET is defined by the American National Standards Institute (ANSI). It uses STS-x (Synchronous Transport Signal level x) framing. SDH is defined by the International Telecommunications Union (ITU) and employs STM-x (Synchronous Transport Module level x) framing.

Various network components required to implement the network architectures of FIGS. 1-7 may be ordered from, Cisco, IBM, and/or other network-component suppliers. The various switch pairs may be interconnected via port channel, Ether Channel® or other connection technology.

Those skilled in the art will appreciate that as various connection technologies advance, the exact connection technologies employed by the various network elements of FIGS. 1-8 may be upgraded and changed without departing from the scope of the present invention.

Figures 1, 9:
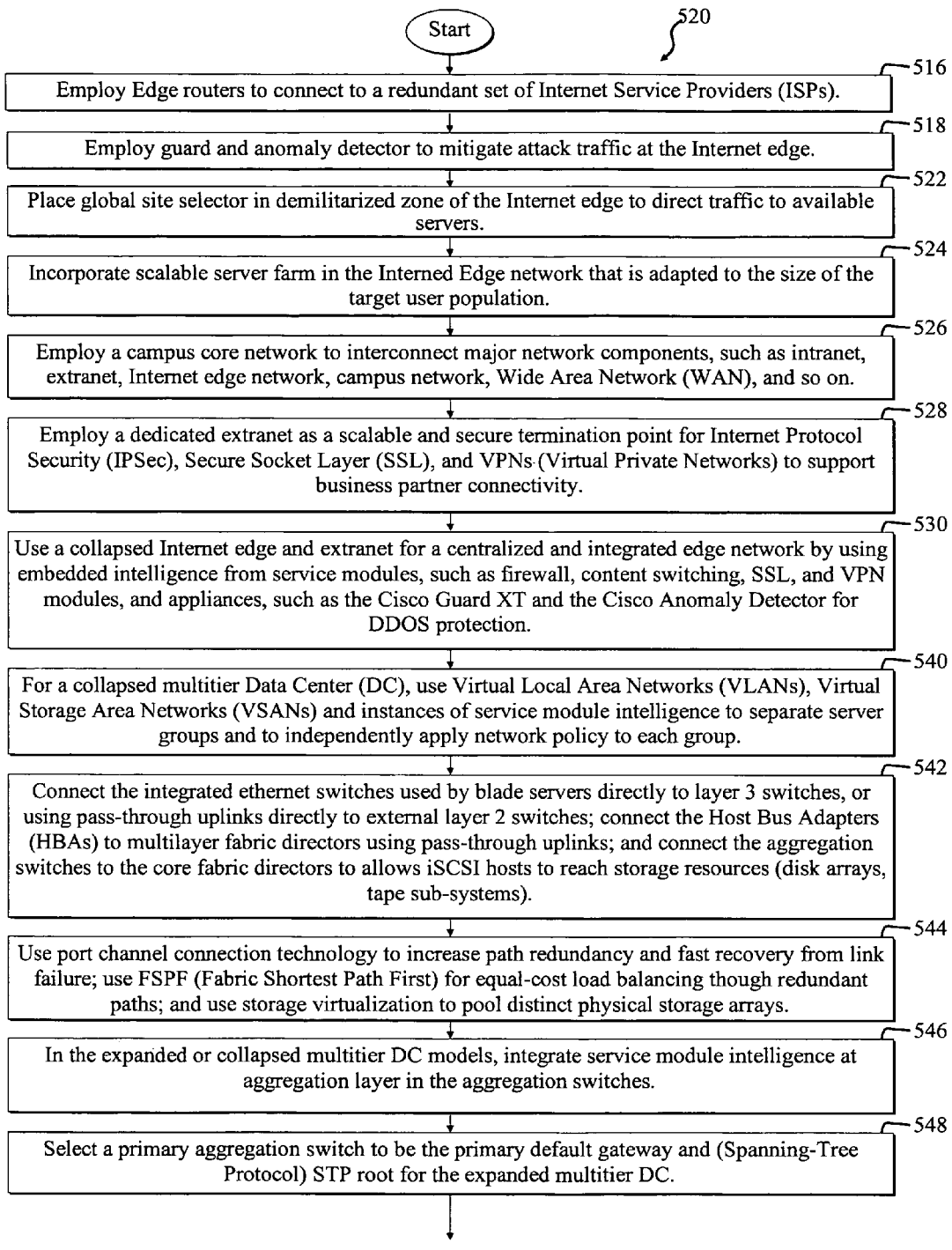
FIG. 9 is a flow diagram of a method that describes various configuration steps used with the architecture template of FIG. 1.
Figures 2, 9:
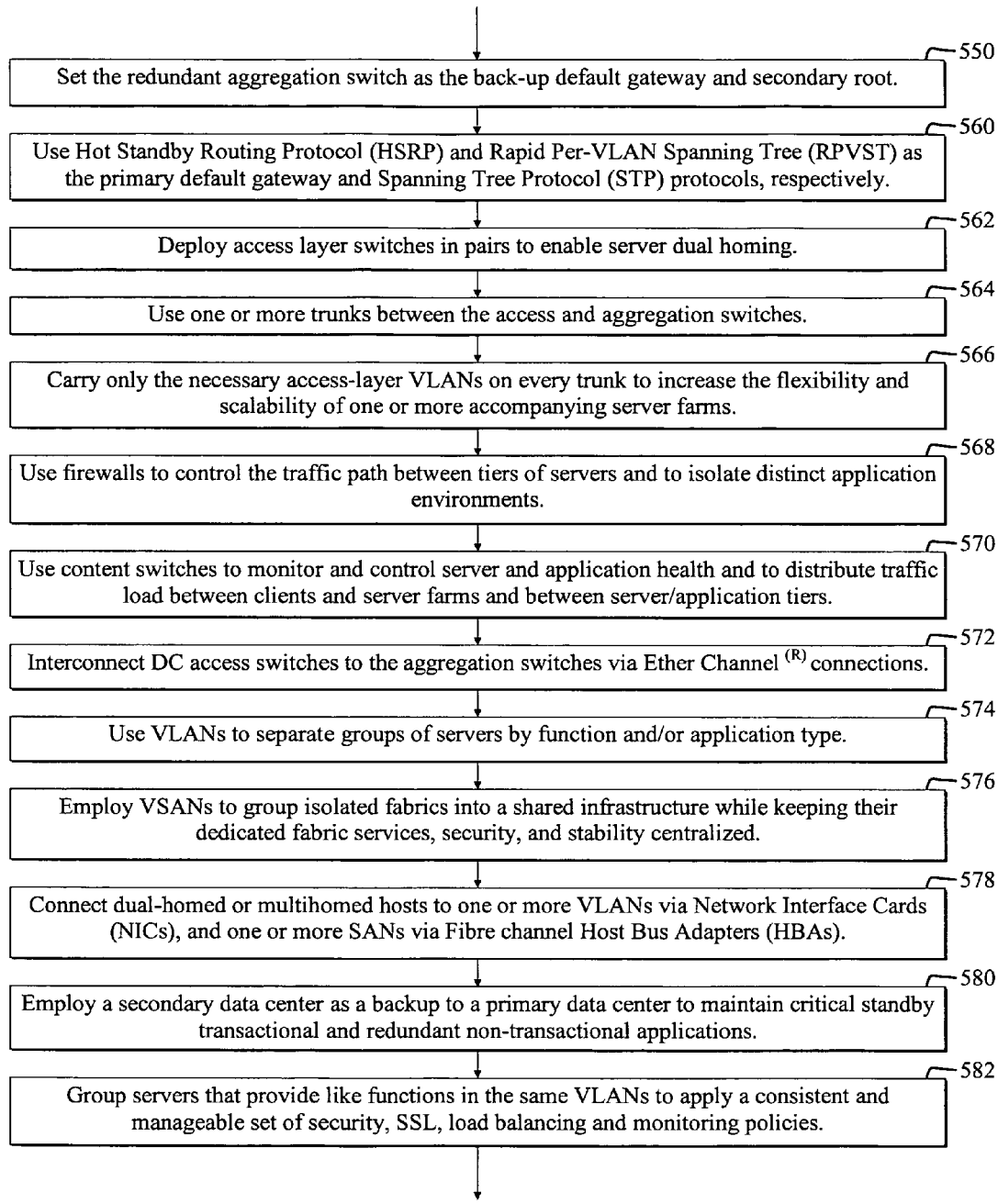
Figures 3, 9:
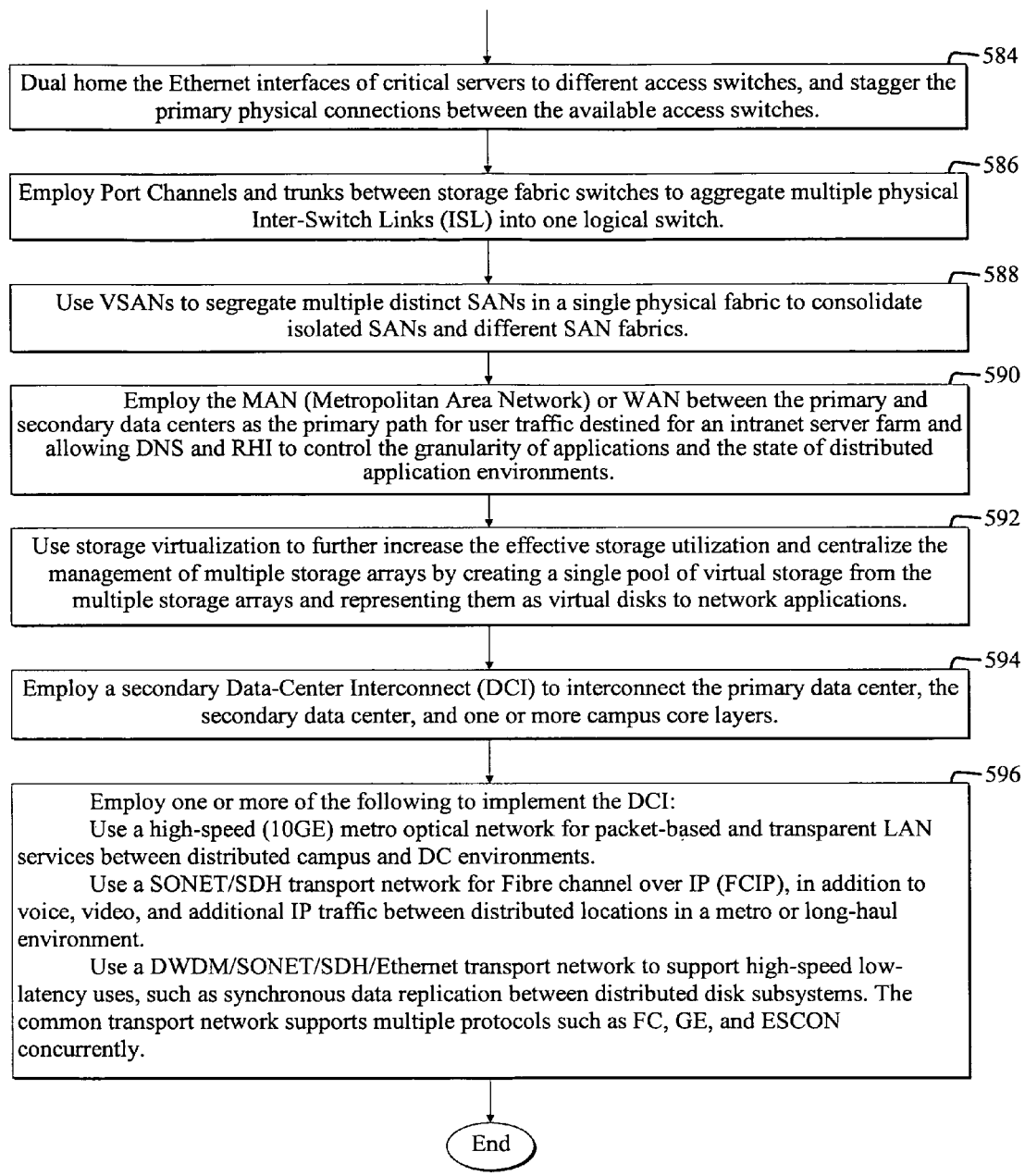

FIG. 9 is a flow diagram of a method 520 for configuring a network adapted for use with the architecture template 10 of FIG. 1. The method 520 includes a first step 516, wherein edge routers, such as the Cisco 7600 routers, connect the enterprise to a redundant set of Internet service Providers (ISPs).

In a subsequent second step, 518, wherein a guard, such as a Cisco Guard XT and an anomaly detector, such as the Cisco Anomaly Detector XT, are strategically incorporated at an Internet edge to the network.

In a subsequent third step 522, a GSS, such as a Cisco Global Site Selector, is incorporated in a demilitarized zone of the Internet edge.

In a fourth step 524 a scalable server farm that is strategically adapted to the size of a given user population is incorporated within the Internet edge.

A fifth step 526 involves employing a campus-core network to interconnect major network components, such as intranet, extranet, Internet edge, WAN, and campus, networks.

A subsequent sixth step 528 involves employing a dedicated extranet as a scalable and secure as a scalable and secure termination point for Internet Protocol Security (IPSec), SSL, and VPNs to support business partner connectivity.

In a seventh step 530, a collapsed Internet edge and extranet are centralized and integrated using embedded intelligence from service modules, such as firewall, content switching, SSL, and VPN modules, and appliances, such as the Cisco Guard XT and the Cisco Anomaly Detector for DDOS protection.

A subsequent eighth step 540 involves using, for a collapsed multitier data center, VLANs, VSANs, and instances of service-module intelligence to separate server groups and to independently apply network policy.

In a subsequent ninth step 542, the ethernet sides of blades servers are connected directly to one or more Layer-3 switches, and HBAs are connected to multilayer directors via pass-through technology. Aggregation switches are connected to the multilayer fabric directors to allow iSCSI hosts to reach storage resources, such as disk arrays, and tape sub-systems.

A tenth step 544 involves using port channel connection technology to increase path redundancy and fast recovery from link failure. FSPF technology is employed to facilitate equal-cost load balancing though redundant connections. FSPF is employed to selectively connect modules of the scalable network architecture 10 of FIG. 1 to facilitate load balancing through redundant connections. Storage virtualization is employed to pool distinct physical storage arrays.

In a subsequent eleventh step 546, service-module intelligence is integrated at aggregation switches of an expanded multitier data center.

In an twelfth step 548, a primary aggregation switch is selected as the primary default gateway and (Spanning-Tree Protocol) STP root for the expanded multitier data center.

A thirteenth step 550 involves setting the redundant aggregation switch of the multitier data center as the back-up default gateway and secondary root.

HSRP and RPVST are employed as the primary default gateway and STP protocols, respectively, in a fourteenth step 560.

In a subsequent fifteenth step 562, access-layer switches are deployed in pairs as needed throughout the network architecture 10 to enable server dual homing.

Aggregation and access switches are interconnected via one or more trunks in a sixteenth step 564.

A seventeenth step 566 involves carrying all access-layer VLANs on every trunk to increase the flexibility and scalability of one or more server farms of the network architecture 10 of FIG. 1.

Subsequently, in a eighteenth step 568, firewalls are employed to control the traffic path between tiers of servers and to isolate distinct application environments within each data center.

A nineteenth step 570 involves using content switches to monitor and control server and application health and to distribute traffic load between clients and server farms and between server/application tiers.

Access switches of the expanded multitier data center are interconnected via Ether Channel® connections in a twentieth step 572.

In a subsequent twenty-first step 574, groups of servers are grouped by function and/or application type via VLANs.

VSANs are employed to group isolated fabrics into a shared infrastructure while keeping their dedicated fabric services, security, and stability integral in a twenty-second step 576.

A twenty-third step 578 involves connecting dual-homed or multihomed hosts to one or more SANs of the data centers via FC HBAs.

A twenty-fourth step 580, a secondary data center is employed as a backup to a primary data center. The secondary data center also maintains critical standby transactional and redundant non-transactional applications.

In a subsequent twenty-fifth step 582, servers that provide like functions are grouped in similar VLANs to facilitate applying a consistent and manageable set of security, SSL, load-balancing and monitoring policies.

A twenty-sixth step 584 involves dual homing critical servers to different access switches, and staggering primary physical connections between the available access switches.

A subsequent twenty-seventh step 586 involves employing port channels and trunks to aggregate multiple physical Inter-Switch Links (ISL) into one logical switch.

VSANs are employed to segregate multiple distinct SANs into one or more physical fabrics to consolidate isolated SANs and SAN fabrics in a subsequent twenty-eighth step 588.

A twenty-ninth step 590 involves employing LAN or a WAN as the primary data path for user traffic destined for an intranet server farm and allowing DNS and RHI to control the granularity of applications and the state of distributed application environments.

In a subsequent thirtieth step 592, storage virtualization is used to further increase the effective storage utilization of and to centralize the management of multiple storage arrays by creating a single pool of virtual storage from the multiple storage arrays and representing them as virtual disks to accompanying applications.

A thirty-first step 594 involves employing a secondary DCI to interconnect the primary data center, the secondary data center, and one or more campus-core layers.

A final thirty-second step 596 involves performing one or more of the following to implement the DCI:

1. Use a high-speed (10GE) metro optical network for packet-based and transparent LAN services between distributed campus and DC environments.

2. Use a SONET/SDH transport network for FCIP, in addition to voice, video, and additional IP traffic between distributed locations in a metro or long-haul environment.

3. Use a DWDM/SONET/SDH/Ethernet transport network to support high-speed low-latency uses, such as synchronous data replication between distributed disk subsystems. Adapt the common transport network to concurrently support multiple protocols, such as FC, GE, and ESCON protocols.

Various steps of the method 520 may be interchanged or omitted without departing from the scope of the present invention. For example, a consolidated method based on the method 520 may include the following steps:

1. Include service-module intelligence at aggregation switches, which are deployed in pairs.

2. Include content switches to monitor server and application health.

3. Employ trunks between access and aggregation switches.

4. Aggregate physical layer switches via port channels and trunks so that the physical switches act as a single logical switch.

5. Separate server farms into VLANs according to function.

6. Group isolated fabrics via VSANs.

7. Use one or more VSANs to consolidate isolated SANs and SAN fabrics into a single fabric.

8. Carry all access-layer VLANs on every trunk.

9. Dual home or multihome critical servers to access switches.

10. Connect dual homed or multihomed hosts to SAN via FC HBAs.

11. Use storage virtualization to further increase the effective storage utilization and centralize the management of multiple storage arrays by creating a single pool of virtual storage from the multiple storage arrays and representing them as virtual disks to the applications.

Figure 10:
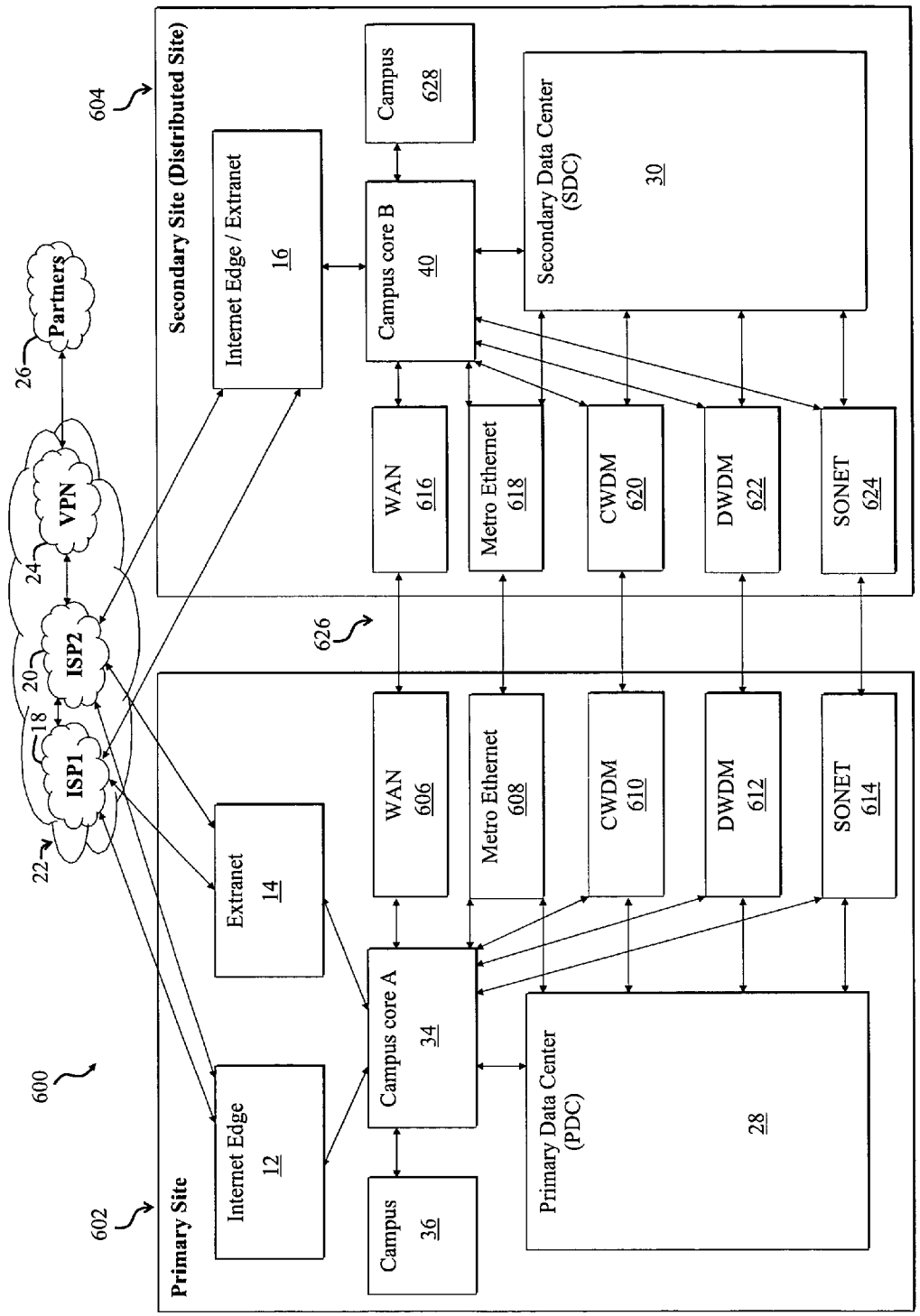
FIG. 10 is a high-level diagram illustrating a simplified alternative network architecture based on the network architecture of FIG. 1.

FIG. 10 is a high-level diagram illustrating an alternative network architecture 600 based on the network architecture 10 of FIG. 1 which depicts a higher level set of building blocks as reference to the overall architecture. With reference to FIGS. 1 and 2, the network 600 is shown connected to the Internet 22 and in communication with the VPN 24 and the partners 26 via the first ISP 18 and the second ISP 20. The network 600 is grouped into a primary site 602 and a secondary site 604. The primary site 602 includes the Internet edge 12, the extranet 14, the campus core 34, the campus network 36, and the large-scale PDC 28. The primary site 602 also includes various DCI components 606-614, including a WAN-interconnect network 606, a metro-Ethernet interconnect system 608, a Coarse Wavelength Division Multiplexing (CWDM) interconnect system 610, a DWDM interconnect system 612, and a SONET interconnect system 614.

The DCI components 606-614 interface the campus core 34 and PDC 28 with corresponding data-center and interconnect components 616-624 of the secondary site 604. The various DCI components 606-624 implement an alternative DCI 626 that facilitates intercommunications between the primary site 602 and the secondary site 604.

The secondary site 604 further includes the EIE 16, the second campus core 40, a second campus network 628 connected to the second campus core 40, and the SDC 30. The SDC interconnect systems 616-624 communicate as needed with the second campus core 40 and the SDC 30 to facilitate relaying information between the primary site 602 and the secondary site 604 via the corresponding interconnect systems 606-614 of the primary site 602.

Different types of DCI systems, fewer DCI system, or additional DCI systems, such as an Ethernet-transport-network DCI systems (see 57 of FIG. 1) may be employed to implement the alternative DCI 626 without departing from the scope of the present invention. Those skilled in the art may readily order or construct such DCI system to meet the needs of a given application without undue experimentation.

Figure 11:
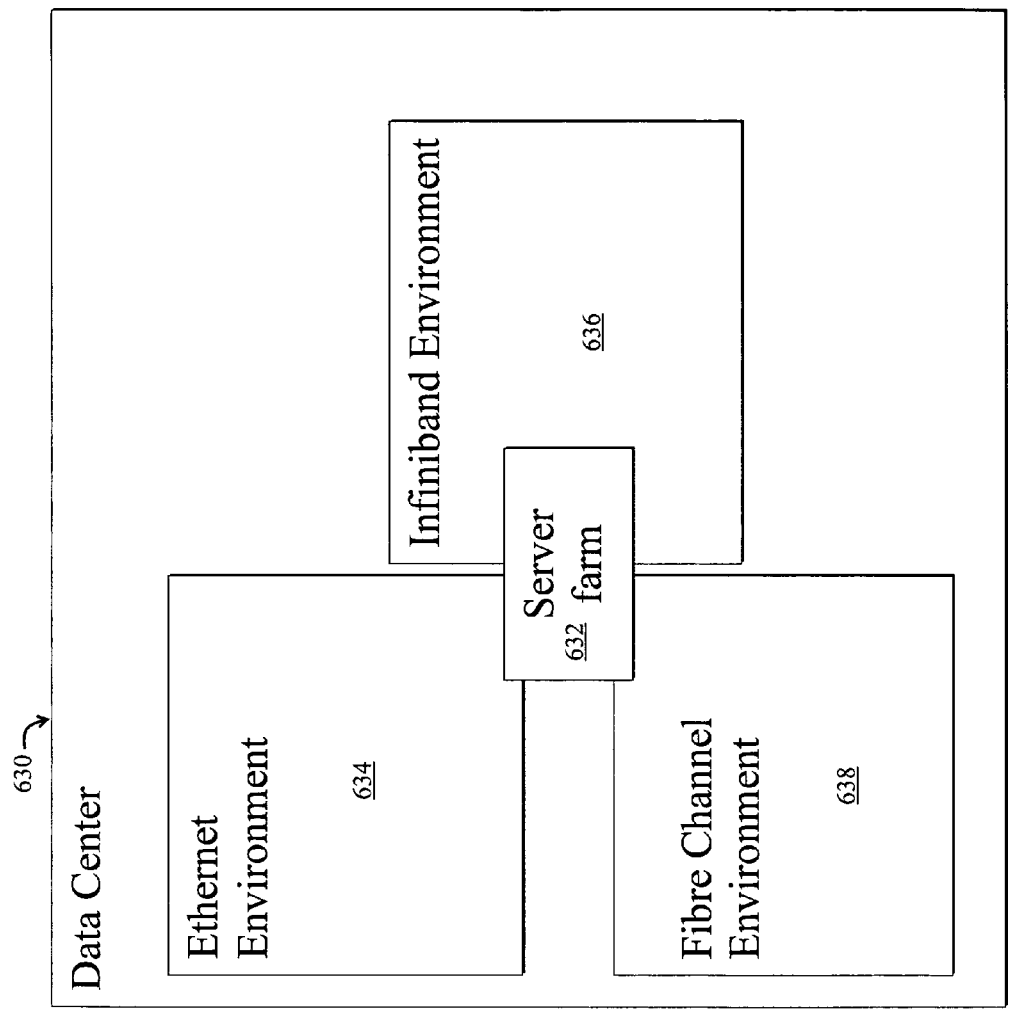
FIG. 11 is a diagram illustrating key functional environments of an exemplary data center according to an embodiment of the present invention.

FIG. 11 is a diagram illustrating key functional environments of an exemplary data center 630 according to an embodiment of the present invention. The data center topology 630 includes a server farm 632 that could use multiple different network fabrics such as Ethernet 634, an Infiniband environment 636, and a Fibre Channel environment 638. The storage environment is analogous to the PDC back ends 56, 62 and the SDC back end 68 of FIG. 1. The server-cluster environment 636 is analogous to the PDC server clusters 51, 53 and the SDC server cluster 55 of FIG. 1. The Ethernet environment 634 is analogous to the remaining data center components, such as the DCI components 606-624 of FIG. 10 and front end sections 52, 58, 64 of FIG. 1.

Figure 12:
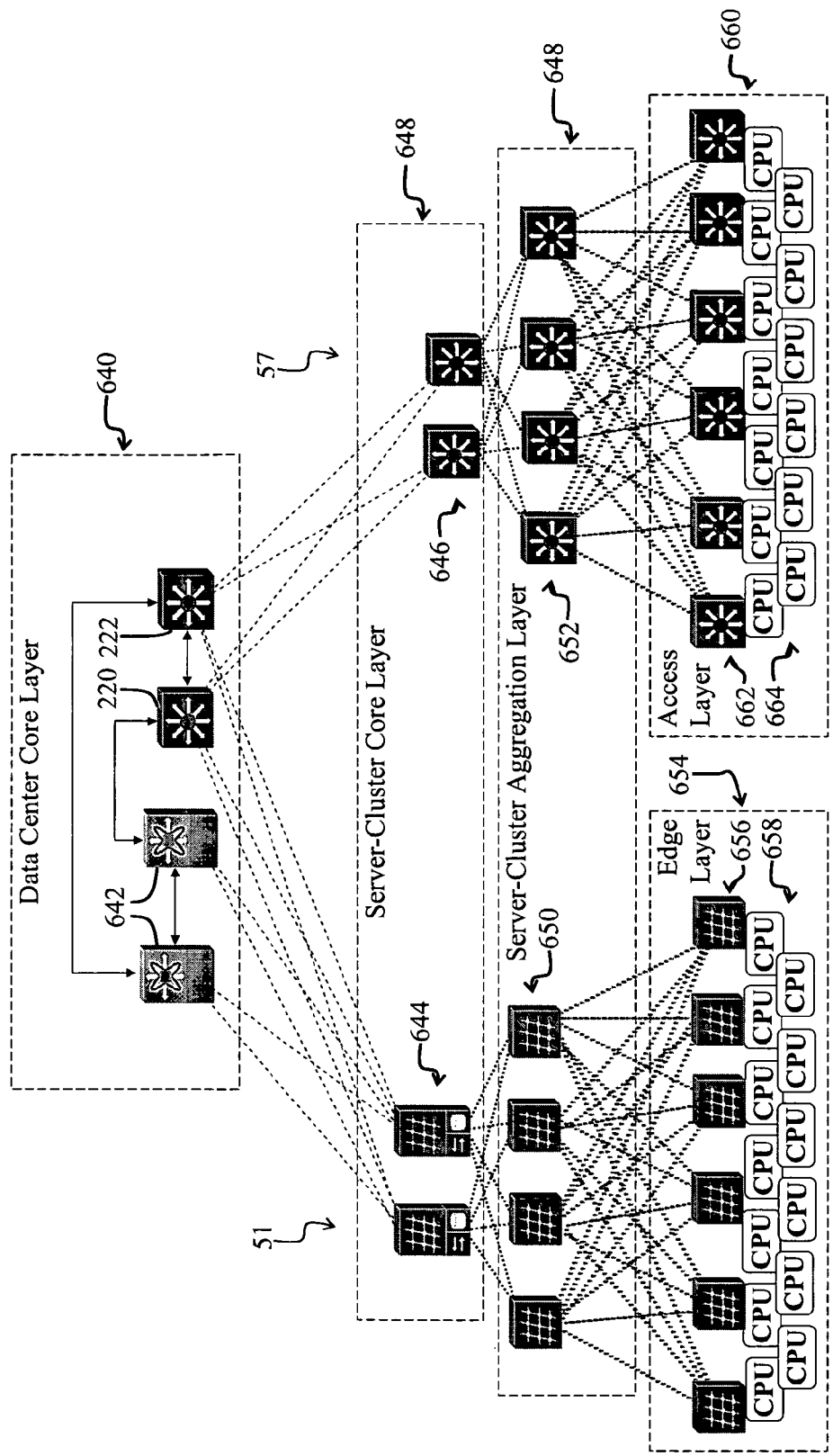
FIG. 12 is a more detailed diagram illustrating the server cluster complexes of FIG. 1.

FIG. 12 is a more detailed diagram illustrating the server cluster complexes 51, 57 of FIG. 1, including the Ethernet server cluster 51, and the InfiniBand server cluster 53. The server clusters 51, 57 are shown communicating with a data center core layer 640, which may correspond to the data center core 46 of FIG. 1, which includes the first multilayer switch 220 and the second multilayer switch 222. For illustrative purposes, the data center core layer 640 is shown including multilayer directors 642 of another data center.

The Ethernet server cluster 51 and the InfiniBand server cluster 57 include a first set of layer-3 switches 644 and a second set of layer-3 switches, respectively. The layer-3 switches 644, 646 each communicate with various modules 220, 222, 642 of the data center core layer 640 as needed for redundancy and back-up purposes to meet the needs of a given application. The layer-3 switches 644, 646 comprise a server-cluster core layer 648. The layer-3 switches 644, 646 are the central switching systems of the Ethernet server cluster 51 and the InfiniBand server cluster 57, respectively.

A server-cluster aggregation layer 648 is connected behind the server-cluster core layer 644 and includes a set of Ethernet-switches 650 associated with the Enet server cluster 51 and a set of InfiniBand switches 652 associated with the InfiniBand server cluster 57. The various switches 650-652 may be implemented via layer-3 switches or other types of switches required for a given application.

The Ethernet server cluster 51 includes an edge layer 654, which includes plural edge-layer switches 656 that are interconnected with the Enet-switches 650 of the aggregation layer 648 and with accompanying Central Processing Units (CPUs) 658 in the edge layer 654.

The InfiniBand server cluster 57 includes an access layer 660 that includes various access-layer switches 662 that are interconnected with the InfiniBand switches 652 of the 648 and with accompanying CPUs 664 in the access layer 660.

The various Edge-layer switches 656 and access-layer switches 662, which may be implemented via layer-2 switches, may communicate with the Ethernet transport network 57 of FIG. 1.

Server clusters 51, 57 may utilize different technology based on specific requirements in server density, latency, over subscription and support for protocols such as Remote Direct Memory Access (RDMA). For illustrative purposes, the server clusters 51, 57 are shown exhibiting two designs, namely, one based on Ethernet switching infrastructure and the other based on Infiniband switching infrastructure, respectively.

The server cluster 71, an Ethernet based cluster, includes a core layer 48 that provides connectivity to other data-center server farms, such as the server farm 60 of FIG. 5, through Ethernet links. The aggregation layer 648 provides an aggregation point for all access switches in the clusters 51, 57. The access layer 660 provides physical connectivity to all the servers (CPUs) 664.

Server cluster 57, an Infiniband based cluster, includes the core layer 648, which provides connectivity to various data center server farms, such as the server farm 60 of FIG. 5, and further provides gateway functions to allow communication with storage and or Ethernet environments through Fibre Channel and Ethernet links.

The aggregation layer 648 provides an aggregation point for various edge switches to connect. The edge layer 654 provides connectivity to various servers (CPUs) 658.

Figure 13:
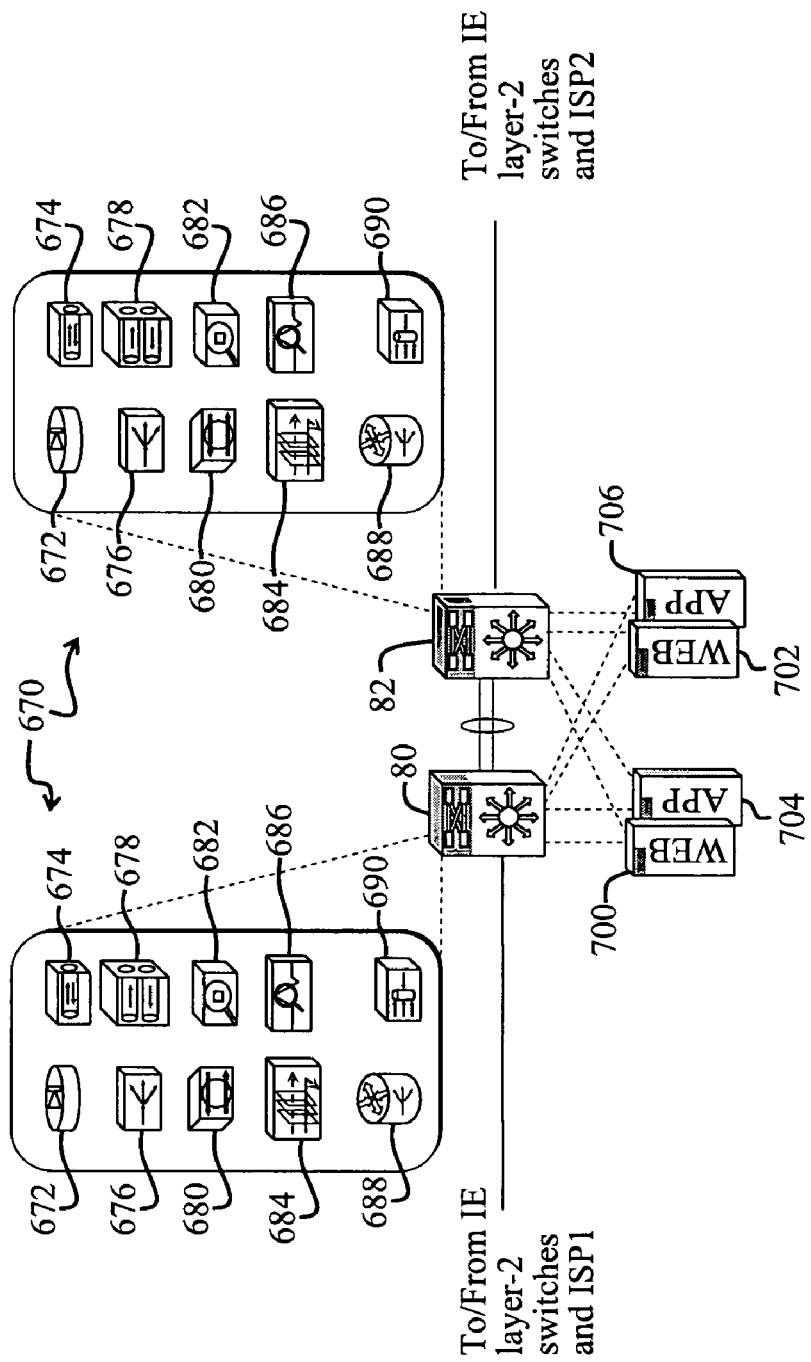
FIG. 13 is a more detailed diagram illustrating exemplary services associated with Internet-edge routers of the Internet edge of FIG. 2.

FIG. 13 is a more detailed diagram illustrating exemplary services 670 associated with Internet-edge routers 80, 82 of the Internet edge 12 of FIGS. 1 and 2. For illustrative purposes, the edge routers 80, 82 of FIG. 2 are shown as layer-3 switches 80, 82 in FIG. 13. The layer-3 switches 80, 82 each incorporated various instances of service module intelligence. The various services modules include a firewall 672, a VPN 674, a content-switching 676, an SSL 678, an intrusion-detection 680, a network-monitoring 682, a DOS-mitigation 684, a DOS-detection 686, a site-selection 688, and a content-caching module 690.

The IE layer-3 switches 80, 82 further communicate with web servers 700, 702 and application servers 704, 706, which provide web and application functionality to the IE 12 of FIG. 1.

The various service modules 672-690 are examples of integrated services, which are integrated with the central switching system 80, 82 of the IE 12 of FIGS. 1 and 2. Functions like site selection and caching that are also part of edge-layer services (in addition to core-layer services) may be implemented via appliances instead of service modules without departing from the scope of the present invention.

While the present embodiment is discussed with reference to data center and accompanying network architectures, embodiments of the present invention are not limited thereto. For example, many types of networks, either wired or wireless, may benefit from data storage, security, and scalability efficiencies afforded by embodiments of the present invention. Employing novel methods, such as those involving incorporating service-module intelligence at aggregation switches, may yield improvements in network resource management for many types of networks.

Variations and embodiments other than those discussed herein are possible. For example, embodiments employing additional or fewer types of network modules and different types of interconnections, such as wireless connections, are possible.

Although a process or module of the present invention may be presented as a single entity, such as software executing on a single machine, such software and/or modules can readily be executed on multiple machines. Furthermore, multiple different modules and/or programs of embodiments of the present invention may be implemented on one or more machines without departing from the scope thereof.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A versatile and scalable network architecture comprising:
   an Internet-edge network;
   a primary data-center network;
   a secondary data-center network;
   one or more campus-core networks connected between the Internet edge and one or more of the primary data center and the secondary data center; and
   a data-center-interconnect network connected between the primary data center and the secondary data center;
   wherein the Internet-edge network further includes one or more of the following:
      a firewall connected between the edge layer-2 switches and a first one of the one or more campus-core networks;
      a guard module connected between the edge layer-2 switches and the one or more firewalls;
      a network analysis module connected between the edge layer-2 switches and the one more firewalls;
      a anomaly detector; and
      an edge server farm that includes one or more Internet servers connected to the edge layer-2 switches via the one or more firewalls.

2. A data-center network comprising:
   a front end having an aggregation layer exhibiting integrated service-module intelligence;
   a storage network, wherein the storage network includes plural interconnected multilayer directors and one or more Fibre Channel hosts using Host Bus Adapters (HBAs); and
   a server farm connected between the front end and the storage network, wherein the HBAs interface one or more data-storage devices to the server farm, and wherein the server farm includes:
      plural layer-2 switches in communication with plural multilayer switches incorporated within the aggregation layer, the plural multilayer switches being layer-3 switches; and
      one or more servers that are dual homed or multihomed with the plural layer-2 switches.

3. The data center of claim 2 wherein the service-module intelligence includes
   functionality implemented via one or more service modules or routines incorporated within or in communication with one or more plural multilayer switches incorporated within the aggregation layer.

4. The data center of claim 3 wherein the one or more service modules include
   one or more of the following: a content-switching module, a Secure Socket Layer (SSL) service module, an intrusion-detection module, an anomaly-detection module, a firewall module, and a content engine.

5. A versatile and scalable network architecture comprising:
   an Internet-edge network;
   a primary data-center network;
   a secondary data-center network;
   one or more campus-core networks connected between the Internet edge and one or more of the primary data center and the secondary data center; and
   a data-center-interconnect network connected between the primary data center and the secondary data center, wherein one or more components of the primary data-center network and the secondary data-center network are interconnected via port channel technology, and wherein Fabric Shortest Path First (FSPF) technology is employed to selectively connect modules of the scalable network architecture to facilitate load-balancing through redundant connections.

6. The network architecture of claim 5 wherein the Internet edge network includes one or more edge routers connected between one or more Internet Service Providers (ISPs) and edge layer-2 switches.

7. A network comprising:
   a primary site including:
      a primary data center that comprises:
         an expanded multitier data center (EMDC) that comprises an EMDC front end, behind which is connected an EMDC server farm, behind which is connected an EMDC back end storage network; and
         a collapsed multitier data center (CMDC) that comprises a CMDC front end, behind which is connected a CMDC server farm, behind which is connected a CMDC back end storage network;
      a first core layer; and
      an Internet edge and an Extranet adapted to connect to the one or more Internet service providers and the first core layer;
   a secondary site including:
      a secondary data center; and
      a second core layer; and
   a data center interconnect connected interfacing the first core layer and the second core layer and interfacing the primary data center and the secondary data center.

8. The network of claim 7 wherein the Internet edge includes one or more of the following service modules implemented at edge switches of the Internet edge:
   a firewall module;
   a Virtual Private Network (VPN) module;
   a content-switching module;
   an Secure Socket Layer (SSL) module;
   an intrusion-detection module;
   a network-monitoring module;
   a Denial-of-Service (DOS)-mitigation module;
   a DOS-detection module, a site-selection module; and
   a content-caching module.

9. The network of claim 7 wherein the secondary site further includes an Interned edge and an Extranet adapted to connect to the one or more Internet service providers and the second core layer.

10. The network of claim 7 wherein at least one of the primary data center and the secondary data center includes a server farm that interfaces a server-cluster environment with a storage environment.

11. The network of claim 10 wherein the server farm further interfaces an Ethernet environment with the server-cluster environment and the storage environment.

12. The network of claim 11 wherein the server-cluster environment includes at least one of an Enet server cluster and an InfiniBand server cluster.

13. A network comprising:

a core layer adapted to connect to outside network environments;

an aggregation layer exhibiting integrated service-module intelligence;

an access layer adapted to connect to one or more servers;

a storage network comprising:

a storage-network edge layer adapted to connect to one or more servers;

a storage-network core layer adapted to connect to one or more storage arrays;

a server cluster environment comprising:

a server-cluster core layer providing gateway connectivity;

a server-cluster aggregation layer for link and switch aggregation; and a server-cluster access layer providing connectivity to one or more servers in the server cluster environment; and a server farm connected between the one or more storage arrays and the server cluster environment.

\* \* \* \* \*

UNITED STATES PATENT AND TRADEMARK OFFICE
CERTIFICATE OF CORRECTION

PATENT NO. : 7,643,468 B1 Page 1 of 1
APPLICATION NO. : 11/227377
DATED : January 5, 2010
INVENTOR(S) : Arregoces et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this

Twenty-first Day of December, 2010

David J. Kappos
*Director of the United States Patent and Trademark Office*